United States Patent
Fujii et al.

(10) Patent No.: US 8,422,043 B2
(45) Date of Patent: Apr. 16, 2013

(54) WATERMARKED DOCUMENT READING APPARATUS WITH IMPROVED ERROR PROCESSING

(75) Inventors: Akihiro Fujii, Saitama (JP); Kurato Maeno, Saitama (JP)

(73) Assignee: Oki Data Corporation, Tokyo (JP)

( * ) Notice: Subject to any disclaimer, the term of this patent is extended or adjusted under 35 U.S.C. 154(b) by 1150 days.

(21) Appl. No.: 10/570,896

(22) PCT Filed: Aug. 24, 2004

(86) PCT No.: PCT/JP2004/012094
§ 371 (c)(1),
(2), (4) Date: Mar. 7, 2006

(87) PCT Pub. No.: WO2005/027501
PCT Pub. Date: Mar. 24, 2005

(65) Prior Publication Data
US 2007/0030521 A1    Feb. 8, 2007

(30) Foreign Application Priority Data
Sep. 12, 2003   (JP) .................... 2003-321103

(51) Int. Cl.
*G06K 15/00*   (2006.01)
(52) U.S. Cl.
USPC .......................... 358/1.14; 358/3.26; 713/176
(58) Field of Classification Search .............. 713/176; 235/454; 348/222.1; 358/1.14; 382/312, 382/100
See application file for complete search history.

(56) References Cited

U.S. PATENT DOCUMENTS

| | | | |
|---|---|---|---|
| 5,740,286 A * | 4/1998 | Esashi ........................... | 382/312 |
| 7,013,021 B2 * | 3/2006 | Sharma et al. ................ | 382/100 |
| 7,574,014 B2 * | 8/2009 | Sharma et al. ................ | 382/100 |
| 7,978,875 B2 * | 7/2011 | Sharma et al. ................ | 382/100 |
| 2001/0053238 A1 | 12/2001 | Katsura et al. | |
| 2002/0057823 A1 * | 5/2002 | Sharma et al. ................ | 382/100 |
| 2002/0120849 A1 * | 8/2002 | McKinley et al. ............ | 713/176 |
| 2003/0021442 A1 | 1/2003 | Suzaki | |
| 2003/0058480 A1 | 3/2003 | Miyake et al. | |
| 2003/0059083 A1 | 3/2003 | Umeda et al. | |
| 2003/0178487 A1 * | 9/2003 | Rogers ......................... | 235/454 |
| 2004/0145661 A1 * | 7/2004 | Murakami et al. ......... | 348/222.1 |
| 2006/0017959 A1 * | 1/2006 | Downer et al. .............. | 358/1.14 |
| 2007/0047760 A1 * | 3/2007 | Sharma et al. ................ | 382/100 |
| 2009/0296983 A1 * | 12/2009 | Sharma et al. ................ | 382/100 |

FOREIGN PATENT DOCUMENTS

| | | |
|---|---|---|
| JP | 2000-270220 | 9/2000 |
| JP | 2001-125484 | 5/2001 |
| JP | 2002-10058 | 1/2002 |
| JP | 2003-078753 | 3/2003 |
| JP | 2003-101756 | 4/2003 |
| JP | 2003-101760 | 4/2003 |
| JP | 2003-101762 | 4/2003 |
| JP | 2003-143388 | 5/2003 |

* cited by examiner

Primary Examiner — Twyler Haskins
Assistant Examiner — Nicholas Pachol
(74) Attorney, Agent, or Firm — Rabin & Berdo, P.C.

(57) ABSTRACT

In a watermarked document printing apparatus, secret information is divided, error correction encoding is performed to each divided pieces of information, and the secret information is converted into a pattern image and embedded in paper. In a watermarked document reading apparatus, after extracting signals from the pattern image on the paper, a reading error is detected by decoding the error correction code for each divided pieces of information, and the portion where the reading error exists is read again. The scanning process is performed again only to the portion where the decoding cannot be performed due to the temporal malfunction of the scanner or the like. Therefore, the pattern image can efficiently be obtained.

8 Claims, 24 Drawing Sheets

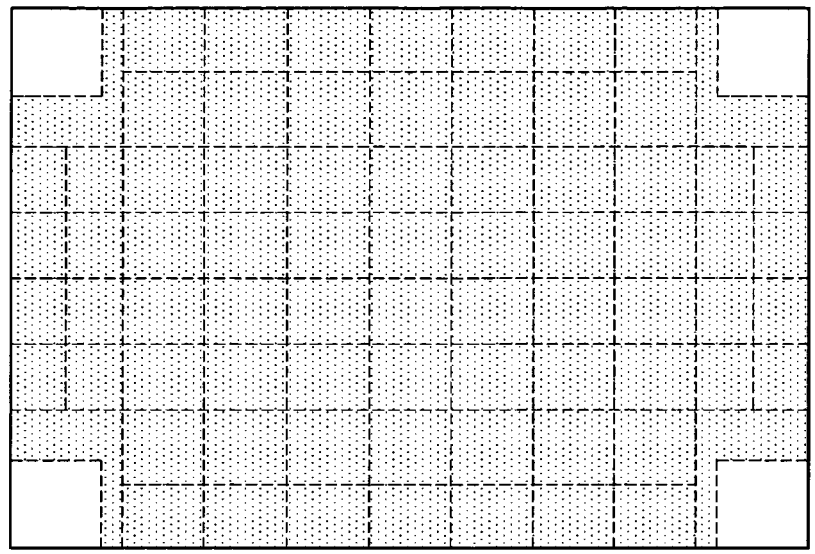
FIG.5A DIVIDED EXAMPLE 1 OF MAIN INFORMATION REGION (HORIZONTALLY DIVIDED)
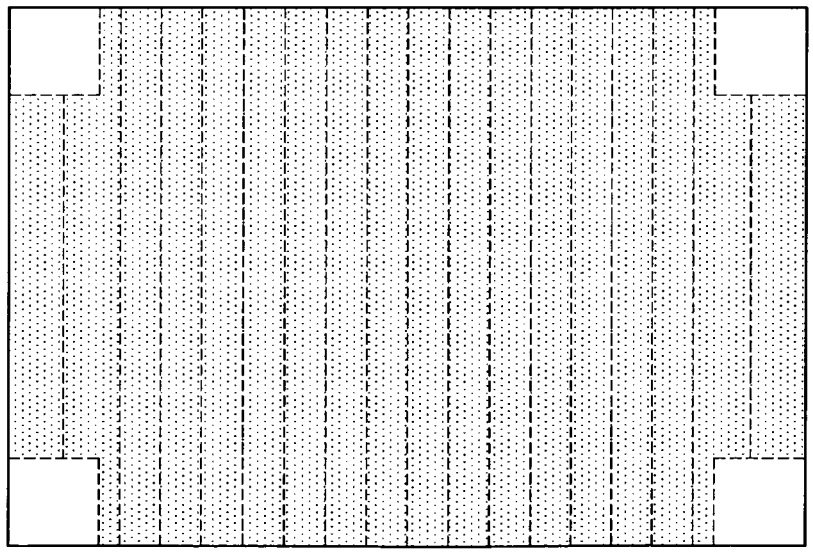
FIG.5B DIVIDED EXAMPLE 2 OF MAIN INFORMATION REGION (VERTICALLY AND HORIZONTALLY DIVIDED)

FIG.8

| REGION NUMBER | DIVIDED DATA NUMBER | DECODING FLAG, ON: SUCCESSFUL DECODING, OFF: OTHER THAN SUCCESSFUL DECODING |
|---|---|---|
| REGION 1 | DIVIDED DATA 1 | ON |
| REGION 2 | DIVIDED DATA 2 | OFF |
| REGION 3 | DIVIDED DATA 3 | ON |
| ⋮ | ⋮ | ⋮ |

FIG.9

| REGION NUMBER | DIVIDED DATA NUMBER | DECODING FLAG, ON: SUCCESSFUL DECODING, OFF: OTHER THAN SUCCESSFUL DECODING |
|---|---|---|
| REGION 1 | DIVIDED DATA 1 | ON |
| REGION 2 | DIVIDED DATA 2 | OFF |
| REGION 3 | DIVIDED DATA 3 | ON |
| ⋮ | ⋮ | ⋮ |
| REGION M+1 | DIVIDED DATA 1 | ON |
| REGION M+2 | DIVIDED DATA 2 | OFF |
| REGION M+3 | DIVIDED DATA 3 | ON |
| ⋮ | ⋮ | ⋮ |

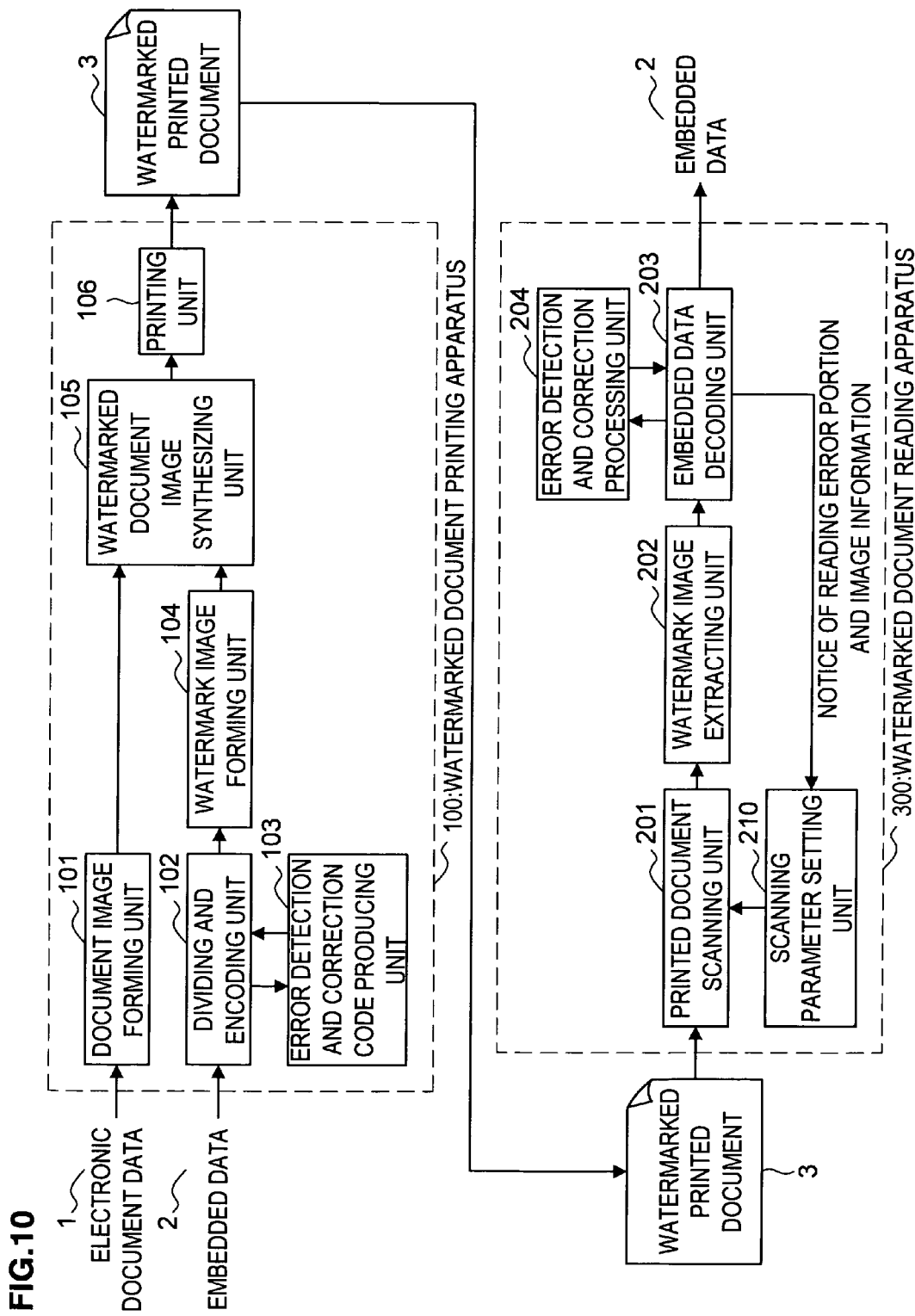

FIG.12

| REGION NUMBER | DIVIDED DATA NUMBER | DECODING FLAG, ON: SUCCESSFUL DECODING, OFF: OTHER THAN SUCCESSFUL DECODING | IMAGE INFORMATION |
|---|---|---|---|
| REGION 1 | DIVIDED DATA 1 | ON | ⋮ |
| REGION 2 | DIVIDED DATA 2 | OFF | ⋮ |
| REGION 3 | DIVIDED DATA 3 | ON | ⋮ |
| ……… | ……… | ……… | ……… |

FIG.16B
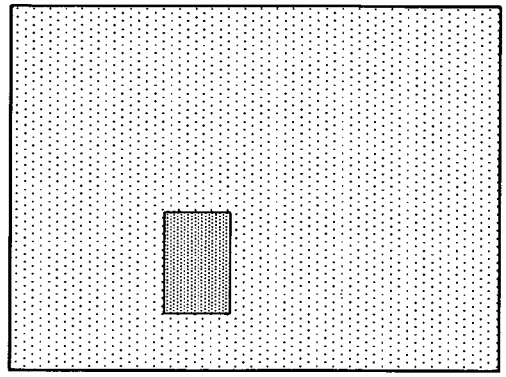
CASE WHERE DECODING CANNOT BE PERFORMED IN PART OF PAPER
REGION WHERE DECORDING IS NOT SUCCESSFULLY PERFORMED
FIG.16A
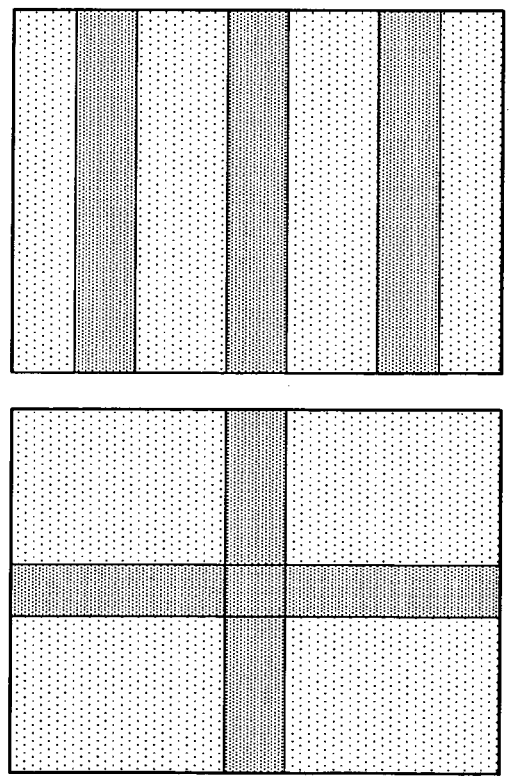
CASE WHERE DECODING CANNOT BE PERFORMED IN VERTICAL AND HORIZONTAL PORTIONS OF PAPER
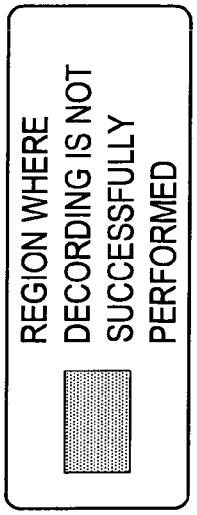
REGION WHERE DECORDING IS NOT SUCCESSFULLY PERFORMED

WATERMARKED DOCUMENT READING APPARATUS WITH IMPROVED ERROR PROCESSING

BACKGROUND OF THE INVENTION

1. Field of the Invention

The present invention relates to a printing apparatus and reading apparatus for a watermarked document in which secret information is embedded by an electronic watermarking technology or the like, a print processing system in which the pieces of apparatus are used as a system component, and a print processing method.

2. Description of the Related Art

In modern-day society, trading is widely performed through "document" such as various application forms and a certificate. Sometimes the documents are dealt with in a form of a digitized electronic document. On the other hand, a printed document has advantages and ease of handling with not shared by the electronic document. This is attributed to the fact that the advantages of the printed document such as low cost, a good glance at the document, ease of carry, and ease of distribution are widely accepted when compared with the electronic document in which a personal computer or the like is required to browse the document. In the printed document, there is a technique of embedding the secret information by the electronic watermarking technology. The technique is used in a variety of applications such as management of the printed document to which digital information is added and detection of printed document tampering.

Usually, in the printed document, in which the secret information is embedded by the electronic watermarking technology, the secret information is obtained by reading the document with a scanner, or a process of detecting the secret information tampering is performed by comparison with information on contents of the original document. However, there is a possibility that reading failure is generated by a temporal malfunction of the scanner. Sometimes the reading failure is generated in the case where a wrinkle or a stain remains on paper. Sometimes printing density is destabilized due to a small amount of toner on a printer side, which leads to fail to read the embedded information.

The reading failure is also a possible problem that occurs in an electronic watermark information reading operation in a copying machine equipped with an electronic watermark reading function. The same problem is also generated, aside from the document, in techniques of printing and reading an image in which the secret information is embedded (for example, see Japanese Patent Application Laid-Open Nos. 2001-157022 and 2002-64700). In addition, the same problem is possibly generated in a barcode system or two-dimensional barcode system, in which the information is printed on paper in the form of an image pattern read with a device.

SUMMARY OF THE INVENTION

In view of the foregoing, an object of the invention is to provide a novel and improved print processing system, watermarked document printing apparatus, watermarked document reading apparatus, print processing method, information reading apparatus, and information reading method, in which a position where an error is generated in reading can accurately be specified and a re-reading process can efficiently be performed to the reading error portion.

In order to solve the problem, a first aspect of the invention provides a print processing system including a watermarked document printing apparatus which performs printing while secret information is embedded in an electronic document and a watermarked document reading apparatus which reads a watermarked document to take out the secret information.

The watermarked document printing apparatus includes a document image forming unit which converts electronic document data into an image having a size which can be printed on paper; a dividing and encoding unit which divides embedded data into arbitrary data lengths; an error detection and correction code producing unit which performs encoding to each divided embedded data block in order to be able to perform error detection and correction; a watermark image forming unit which produces watermark images, respectively arranged in divided regions specified on the paper, by converting each encoding data from the embedded data into a pattern image, error correction encoding being performed to the embedded data; a watermarked document image synthesizing unit which synthesizes a document image produced by the document image forming unit and the watermark image produced by the watermark image forming unit; and a printing unit which prints a watermarked document image produced by the watermarked document image synthesizing unit.

The watermarked document reading apparatus includes a printed document scanning unit which reads the watermarked printed document in a form of the image; a watermark image extracting unit which extracts the pattern image, embedded in the watermark image, from the watermarked document image read by the printed document scanning unit; an embedded data decoding unit which decodes the error detection and correction code with respect to each divided region, the embedded data decoding unit performing feedback of information (such as a list) on the divided region where the error cannot be corrected as a result of the decoding process to the printed document scanning unit; and an error detection and correction processing unit which decodes the error correction code.

According to the print processing system of the first aspect of the invention, in the watermarked document printing apparatus, after the secret information is divided to perform the error correction encoding to each divided piece of information, the secret information can be converted into the pattern image and embedded in the paper. On the reading side, after the signal is extracted from the pattern image on the paper, the reading error is detected by decoding the error correction code for each divided piece of information, and the portion in which the reading error exists can be read again. The print processing system of the first aspect of the invention has the following effects.

(1-1) The scanning process is performed again only to the portion, where the decoding cannot be performed due to the temporal malfunction of the scanner or the like. Therefore, the pattern image can efficiently be obtained.

(1-2) In the case where external environment easily has an effect on the scanner such as the stand type scanner (direct scanner), the scanning process is performed again to the portion where the decoding cannot be performed due to a shadow generated by a substance existing between the image and a light source or halation generated by outside light. Therefore, because the decoding process is performed to only the portion which cannot be obtained, the portion can efficiently be obtained.

(1-3) Even in the apparatus which can not scan only some portion of the paper in the re-scanning process, because the decoding process is performed to only the portion in which the decoding cannot be performed in the image processing, the process can efficiently be performed.

(1-4) The watermarked document reading apparatus may further include a display unit which displays the divided region where the decoding cannot finally be performed. The region where the decoding cannot finally be performed is represented to the user, so that the user can make the determination of the response from the contents.

The following applications can be realized in the print processing system of the invention.

The watermarked document reading apparatus may further include a scanning parameter setting unit which change a parameter of the printed document scanning unit based on the image information fed back by the embedded data decoding unit.

According to the print processing system, because the parameter of the reading apparatus is adjusted in performing re-reading, the following effect is obtained.

(2-1) The portion where the decoding cannot be performed due to the unevenness of printing density caused by light toner on the printing side can be dealt with by dynamically or statically changing the scanning parameter according to the image information of the region.

The watermarked document reading apparatus may further include an error cause determination unit which makes determination of an error cause from the divided region where the decoding cannot be performed; and a user operation instruction unit which provides an instruction to a user based on the error cause.

According to the print processing system, the following effect is obtained.

(3-1) In the case where the decoding cannot be performed due to the paper wrinkle or dirt, it is necessary that the user smoothes the wrinkle or removes the dirt. Therefore, the third embodiment has the function of estimating the state of the paper to provide the instruction to the user. In the re-scanning after the paper is correctly placed on the scanner again, the process can efficiently be performed because only the region where the decoding cannot be performed is processed.

The watermarked document reading apparatus may further include an extraction parameter setting unit which sets a process parameter of the watermark image extracting unit based on the image information of the region where the decoding is not successfully performed.

According to the print processing system, on the reading side, after the signal is extracted from the pattern image, the reading error is detected by decoding the error correction code for each divided piece of information, and the portion in which the reading error exists is processed again by changing the process of extracting the signal from the pattern image. Therefore, the following effects are obtained.

(4-1) The pattern image extraction process is performed again only to the portion, where the decoding cannot be performed due to the temporal malfunction of the scanner. Therefore, the unit pattern can efficiently be obtained.

(4-2) The portion where the decoding cannot be performed due to the unevenness of printing density caused by light toner on the printing side can be dealt with by dynamically or statically changing the pattern image extraction parameter according to the image information of the region.

(4-3) Since the proper parameter can be set according to the image characteristics of each divided region, the unit pattern can efficiently be obtained, even if the regions differ from one another in the cause of the failure in decoding.

The watermarked document reading apparatus may further include a scanning parameter setting unit which provides an instruction of a parameter to the printed document scanning unit and an image buffer unit in which the plural watermarked document images obtained by the printed document scanning unit are stored, wherein the printed document scanning unit performs multiple scanning to the watermarked printed document.

According to the print processing system, on the reading side, the watermarked print images can be stored by performing the process of scanning the watermarked printed document multiple times while the scanning parameter is changed. On the other hand, in the decoding process, the decoding can be performed in each divided region from the plural watermarked print images obtained by the previous scanning process. The following effects are obtained by performing the scanning process and the decoding process in tandem.

(5-1) In the case where the scanning is repeatedly performed until the decoding can successfully be performed for all the regions, the decoding is sequentially performed in tandem with the multiple scanning, so that the process can efficiently be performed.

(5-2) The parameter is changed in each scanning, so that the fifth embodiment can widely deal with the problems such as the unevenness of the printing density caused by the light toner on the printing side.

(5-3) The process can efficiently be performed in the case where the scanning is required again because the image quality is varied in each scanning by the change in external environment like the stand type scanner.

The watermarked document reading apparatus may further include a good image quality determination unit which selects image quality suitable to the decoding from the images stored in the image buffer unit.

According to the print processing system, on the reading side, the watermarked print images can be stored by performing the process of scanning the watermarked printed document multiple times while the scanning parameter is changed. On the other hand, in the decoding process, the decoding can be performed in each divided region from the plural watermarked print images obtained by the previous scanning process. The following effects are obtained by performing the decoding process after the multiple scanning processes.

(6-1) The plural document images are obtained with the scanner, and then the decoding is sequentially performed for the image having the image quality suitable to the decoding in tandem with the multiple scanning, so that the process can efficiently be performed.

(6-2) The parameter is changed in each scanning, so that the sixth embodiment can widely deal with the problems such as the unevenness of the printing density caused by the light toner on the printing side.

(6-3) The process can efficiently be performed in the case where the scanning is required again because the image quality is varied in each scanning by the change in external environment like the stand type scanner.

The watermarked document reading apparatus may further include an error detection and correction code producing unit which performs the same process as the detection and correction code producing unit of the watermarked document printing apparatus; information restoring means for determining information embedded in the whole of the image in the same manner as the dividing and encoding unit of the watermarked document printing apparatus from the embedded data outputted from the embedded data decoding unit; and error determination means for making error determination in pattern image unit by comparing information obtained from the information restoring means and information obtained from the watermark image extracting unit.

The reading error is detected in each divided piece of information unit in the above applications. On the other hand, in this application, the following effect is obtained by detecting the error position in each pattern image unit.

(7-1) The presence or absence of the error is determined in each unit pattern, so that the error point can be specified in detail.

The watermark image-forming unit may insert arbitrary data into a portion where the pattern image is lacking in order to fit in an area of the divided region, when the pattern images are arranged in the divided regions specified on the paper.

A second aspect of the invention provides a watermarked document printing apparatus which performs printing while secret information is embedded in an electronic document. The watermarked document printing apparatus includes a document image forming unit which converts electronic document data into an image having a size which can be printed on paper; a dividing and encoding unit which divides embedded data into arbitrary data lengths; an error detection and correction code producing unit which performs encoding to each divided embedded data block in order to be able to perform error detection and correction; a watermark image forming unit which produces watermark images, respectively arranged in divided regions specified on the paper, by converting each encoding data from the embedded data into a pattern image, error correction encoding being performed to the embedded data; a watermarked document image synthesizing unit which synthesizes a document image produced by the document image forming unit and the watermark image produced by the watermark image forming unit; and a printing unit which prints a watermarked document image produced by the watermarked document image synthesizing unit.

In an example of applications of the watermarked document printing apparatus according to the invention, the watermark image-forming unit may insert arbitrary data into a portion where the pattern image is lacking in order to fit in an area of the divided region, when the pattern images are arranged in the divided regions specified on the paper.

A third aspect of the invention provides a watermarked document reading apparatus which reads a watermarked document to take out secret information. The watermarked document reading apparatus includes a printed document scanning unit which reads the watermarked printed document in a form of the image; a watermark image extracting unit which extracts the pattern image, embedded in the watermark image, from the watermarked document image read by the printed document scanning unit; an embedded data decoding unit which decodes the error detection and correction code with respect to each divided region, the embedded data decoding unit performing feedback of information (such as a list) on the divided region where the error cannot be corrected as a result of the decoding process to the printed document scanning unit; and an error detection and correction processing unit which decodes the error correction code.

In the watermarked document reading apparatus of the invention, the following applications can be realized from the same viewpoint as the print processing system of the invention.

(i) A watermarked document reading apparatus may further include a scanning parameter setting unit which changes a parameter of the printed document scanning unit based on the image information fed back by the embedded data decoding unit.

(ii) A watermarked document reading apparatus may further include an error cause determination unit which makes determination of an error cause from the divided region where the decoding cannot be performed; and a user operation instruction unit which provides an instruction to a user based on the error cause.

(iii) A watermarked document reading apparatus may further include an extraction parameter setting unit which sets a process parameter of the watermark image extracting unit based on the image information of the region where the decoding is not successfully performed.

(iv) A watermarked document reading apparatus may further include a scanning parameter setting unit which provides an instruction of a parameter to the printed document scanning unit; and an image buffer unit in which the plural watermarked document images obtained by the printed document scanning unit are stored, wherein the printed document scanning unit performs multiple scanning to the watermarked printed document.

(v) A watermarked document reading apparatus may further include a good image quality determination unit which selects image quality suitable to the decoding from the images stored in the image buffer unit.

(vi) A watermarked document reading apparatus may further include an error detection and correction code producing unit which performs the same process as a detection and correction code producing unit included in a watermarked document printing apparatus, the watermarked document printing apparatus performing printing while the secret information is embedded in an electronic document; information restoring means for determining information embedded in the whole of the image in the same manner as the dividing and encoding unit of the watermarked document printing apparatus from the embedded data outputted from the embedded data decoding unit; and error determination means for making error determination in pattern image unit by comparing information obtained from the information restoring means and information obtained from the watermark image extracting unit.

(vii) A watermarked document reading apparatus may further include a display unit which displays the divided region where the decoding cannot finally be performed.

A fourth aspect of the invention provides a print processing method including a watermarked document printing step of performing printing while secret information is embedded in an electronic document and a watermarked document reading step of reading watermarked document to take out secret information.

The watermarked document printing step includes a document image forming step of converting electronic document data into an image having a size which can be printed on paper; a dividing and encoding step of dividing embedded data into arbitrary data lengths; an error detection and correction code producing step of performing encoding to each divided embedded data block in order to be able to perform error detection and correction; a watermark image forming step of producing watermark images, respectively arranged in divided regions specified on the paper, by converting each encoding data from the embedded data into a pattern image, error correction encoding being performed to the embedded data; a watermarked document image synthesizing step of synthesizing a document image produced by the document image forming step and the watermark image produced by the watermark image forming step; and a printing step of printing a watermarked document image produced by the watermarked document image synthesizing step.

The watermarked document reading step includes a printed document scanning step of reading the watermarked printed document in a form of the image; a watermark image extracting step of extracting the pattern image, embedded in the watermark image, from the watermarked document image read by the printed document scanning step; an embedded data decoding step of decoding the error detection and correction code with respect to each divided region, the embedded data decoding step performing feedback of information on the divided region where the error cannot be corrected as a result of the decoding process to the printed document scanning step; and an error detection and correction processing step of decoding the error correction code.

In the watermarked document processing method of the invention, the following applications can be realized from the same viewpoint as the print processing system of the invention.

(i) The watermarked document reading step may further include a scanning parameter setting step of changing a parameter of the printed document scanning unit based on the image information fed back by the embedded data decoding step.

(ii) The watermarked document reading step may further include an error cause determination step of making determination of an error cause from the divided region where the decoding cannot be performed; and a user operation instruction step of providing an instruction to a user based on the error cause.

(iii) The watermarked document reading step may further include an extraction parameter setting step of setting a process parameter of the watermark image extracting step based on the image information of the region where the decoding is not successfully performed.

(iv) The watermarked document reading step may further include a scanning parameter setting step of providing an instruction of a parameter in the printed document scanning step and an image buffer step of storing the plural watermarked document images obtained by the printed document scanning step, wherein the printed document scanning step performs multiple scanning of the watermarked printed document.

(v) The watermarked document reading step may further include a good image quality determination step of selecting image quality suitable to the decoding from the images stored in the image buffer step.

(vi) The watermarked document reading step may further include an error detection and correction code producing step of performing the same process as the detection and correction code producing step of the watermarked document printing step; an information restoring step of determining information embedded in the whole of the image in the same manner as the dividing and encoding step of the watermarked document printing step from the embedded data outputted in the embedded data decoding step; and an error determination step of making error determination in pattern image unit by comparing information obtained from the information restoring step and information obtained from the watermark image extracting step.

(vii) In the watermark image-forming step, arbitrary data may be inserted into a portion where the pattern image is lacking in order to fit in an area of the divided region, when the pattern images are arranged in the divided regions specified on the paper.

(viii) The watermarked document reading step may further include a display step of displaying the divided region where the decoding cannot finally be performed.

A fifth aspect of the invention provides an information reading apparatus which reads information corresponding to a pattern from an image in which patterns having spatial periods are regularly arranged. The information reading apparatus includes information extraction means for reading the information from the image; error detection means for detecting an error from the extracted information; and error range determination means for determining an on-image position corresponding to a position of the detected error.

In the information reading apparatus of the invention, the following application can be realized.

(i) The error detection means may perform an error correction process to the information to detect only the error to which correction cannot be performed, the information being obtained from the information extraction means.

(ii) An information reading apparatus may further include error correction means for correcting the error of the information read by the information extraction means; information restoring means for restoring all the pieces of information stored in the image based on the corrected information; and error determination means for specifying a pattern recorded in the image from the restored information, the error determination means making determination of the error in pattern unit on the image by comparing the specified pattern and the pattern specified by the information extraction means.

(iii) The error range determination means may determine an error range from spatial density of an error pattern on the image.

(iv) An information reading apparatus may further include print reading means for reading a print to obtain the image.

(v) The print reading means may read a partial image from the print again, the partial image corresponding to the error range detected on the image.

(vi) An information reading apparatus may further include instruction means for providing an instruction that the partial image corresponding to the error range detected on the image is read from the print again to the print reading means.

(vii) An information reading apparatus may further include display means for displaying the error range detected on the image while the error range can visually be perceived on the image.

A sixth aspect of the invention provides an information reading method of reading information corresponding to a pattern from an image in which patterns having spatial periods are regularly arranged. The information reading method includes an information extraction step of reading the information from the image; an error detection step of detecting an error from the extracted information; and an error range determination step of determining an on-image position corresponding to a position of the detected error.

In the information reading method of the invention, the following applications can be realized.

(i) In the error detection step, an error correction process may be performed to the information to detect only the error to which correction cannot be performed, the information being obtained from the information extraction step.

(ii) An information reading may further include an error correction step of correcting the error of the information read by the information extraction step; an information restoring step of restoring all the pieces of information stored in the image based on the corrected information; and an error determination step of specifying a pattern recorded in the image from the restored information, the error determination step making determination of the error in pattern unit on the image by comparing the specified pattern and the pattern specified by the information extraction step.

(iii) In the error range determination step, an error range may be determined from spatial density of an error pattern on the image.

(iv) An information reading method may further include a print reading step of reading a print to obtain the image.

(v) A partial image may be read from the print again, the partial image corresponding to the error range detected on the image.

(vi) An information reading method may further include an instruction step of providing an instruction that the partial image corresponding to the error range detected on the image is read from the print again.

(vii) An information reading method may further include a display step of displaying the error range detected on the image while the error range can visually be perceived on the image.

Thus, according to the invention, the position where the error is generated in reading can accurately be specified and the process of re-reading the reading error portion can efficiently be performed.

BRIEF DESCRIPTION OF THE DRAWINGS

FIG. 5 shows an example of embedded data into a main information region, FIG. 5A shows a case where data is embedded while horizontally divided, and FIG. 5B shows a case where data is embedded while vertically and horizontally divided;

FIG. 8 shows an example of a scanning region table;

FIG. 9 shows an example of a scanning region table when the same data is embedded in plural regions;

FIG. 10 is a block diagram showing a schematic configuration of a print processing system according to a second embodiment;

FIG. 12 shows an example of a scanning region table;

FIG. 16 shows an example of an region where decoding cannot be performed, FIG. 16A shows a case where the decoding cannot vertically and horizontally be performed in paper, and FIG. 16B shows a case where the decoding cannot be performed in part of the paper;

DESCRIPTION OF THE PREFERRED EMBODIMENTS

Figure 1:
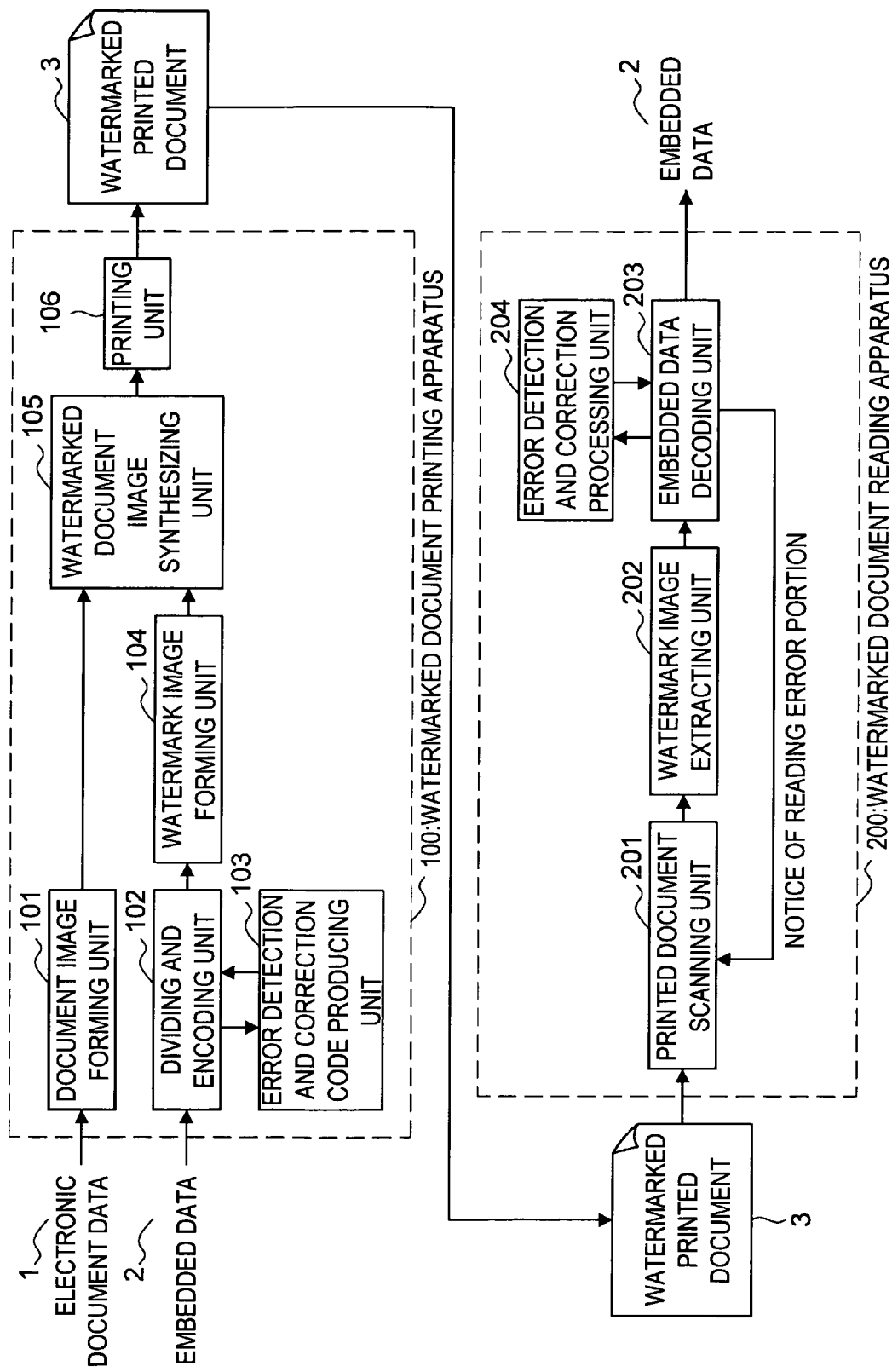
FIG. 1 is a block diagram showing a schematic configuration of a print processing system according to a first embodiment of the invention.

A print processing system, a watermarked document printing apparatus, a watermarked document reading apparatus, a print processing method, an information reading apparatus, and an information reading method according to preferred embodiments of the invention will be described below with reference to the accompanying drawings. In the specification and the drawings, a component having the substantially same function and configuration is designated by the same reference numeral, and the repeated description will be omitted.

(First Embodiment)

FIG. 1 is a block diagram showing a schematic configuration of a print processing system according to a first embodiment of the invention. Referring to FIG. 1, the print processing system includes a watermarked document printing apparatus 100 and a watermarked document reading apparatus 200. The watermarked document printing apparatus 100 is an apparatus which performs the printing while the secret information is embedded in the electronic document. The watermarked document reading apparatus 200 is an apparatus which reads the watermarked printed document with the scanner to take out the secret information embedded in the document. The pieces of apparatus will be described in detail below.

(Watermarked Document Printing Apparatus 100)

As shown in FIG. 1, an electronic document data 1 and an embedded data 2 are inputted to the watermarked document printing apparatus 100, and a watermarked printed document 3 is outputted from the watermarked document printing apparatus 100. The watermarked document printing apparatus 100 includes a document image forming unit 101, a dividing and encoding unit 102, an error detection and correction code producing unit 103, a watermark image forming unit 104, a watermarked document image-synthesizing unit 105, and a printing unit 106.

The electronic document data 1 is electronic data of a document. For example, the electronic document data 1 is a text file and an electronic file of a word processor, a spreadsheet program, and the like. The embedded data 2 is information embedded in a printed document. For example, the embedded data 2 is document management information and associated information thereof. In the case where the embedded data 2 is used for tampering detection, the embedded data 2 is information on original document contents.

The document image-forming unit 101 performs a process of converting the electronic document data 1 into an image having a size which can be printed on paper.

The dividing and encoding unit 102 performs a process of dividing the embedded data 2 into arbitrary data lengths. The division may be performed after a conversion process such as encryption is performed to the embedded data. A hash value (for example, MD5 and SIIA-1), an electronic signature (SIIA1 with RSA Encryption), HMAC, and the like may be added in order to verify consistency of the whole of the data before the data is divided.

The error detection and correction code-producing unit 103 is an engine unit which performs encoding such that error detection and correction can be performed to each divided embedded data block. Examples of the encoding method include a parity check code, a hamming code, and a BCH code. Checksum which do not have correction ability but perform error detection may be adopted. The encoding method and encoding parameters may be changed according to a level of importance of the data.

The watermark image-forming unit 104 performs a process of producing an image (hereinafter referred to as watermark image). In the watermark image, each pieces of encoded data of the embedded data 2 to which the error detection and correction encoding is performed is converted into a pattern image called unit pattern, and each pattern image is arranged in a region (hereinafter referred to as divided region) specified on the paper. The detailed method of producing the watermark image will be described later along with explanation of an operation of the print processing system.

The watermarked document image-synthesizing unit 105 performs a process of synthesizing the document image produced by the document image-forming unit 101 and the watermark image produced by the watermark image-forming unit 104.

The printing unit 106 performs a process of printing the watermarked document image produced by the watermarked document image-synthesizing unit 105. The watermarked printed document 3 is the printed document which is printed by the printing unit 106.

The watermarked document printing apparatus 100 is configured as described above. The watermarked printed document 3 printed by the watermarked document printing apparatus 100 is inputted to the below-mentioned watermarked document reading apparatus 200.

(Watermarked Document Reading Apparatus 200)

As shown in FIG. 1, the watermarked printed document 3 is inputted to the watermarked document reading apparatus 200, and the embedded data 2 is outputted from the watermarked document reading apparatus 200. The watermarked document reading apparatus 200 includes a printed document scanning unit 201, a watermark image extracting unit 202, an embedded data decoding unit 203, and an error detection and correction processing unit 204.

The printed document-scanning unit 201 performs a process of reading the watermarked printed document as the image. Specifically the printed document-scanning unit 201 is a scanner or the like. Both a flat-bed type scanner and a stand type scanner can be used as the printed document-scanning unit 201. The printed document-scanning unit 201 performs the reading process again based on feedback information from the embedded data-decoding unit 203.

The watermark image extracting unit 202 performs a process of extracting a unit pattern embedded in the watermark image from the watermarked document image read by the printed document scanning unit 201. A signal expressed by the unit pattern is data in which the embedded data 2 is encoded by an error detection and correction code.

The embedded data-decoding unit 203 decodes the error detection and correction code of the unit pattern signal for each divided region. After the decoding process, the embedded data-decoding unit 203 performs feedback of information on a list of divided regions, to which the error correction cannot be performed, to the printed document-scanning unit 201. Thus, the embedded data decoding unit 203 functions as error-range determination means for determining the on-image position corresponding to the error position.

The error detection and correction-processing unit 204 is an engine unit which decodes an error detection code.

In the case where the embedded data 2 is encrypted after the embedded data 2 can be extracted, the decoding process of the encryption is performed. When the hash value, the electronic signature, HMAC and the like exist in order to verify the consistency of the whole of the data, the consistency is confirmed.

The print processing system of the first embodiment is configured as described above. Then, an operation of the first embodiment will be described. First the operation of the watermarked document printing apparatus 100 will be described.

Figure 2:
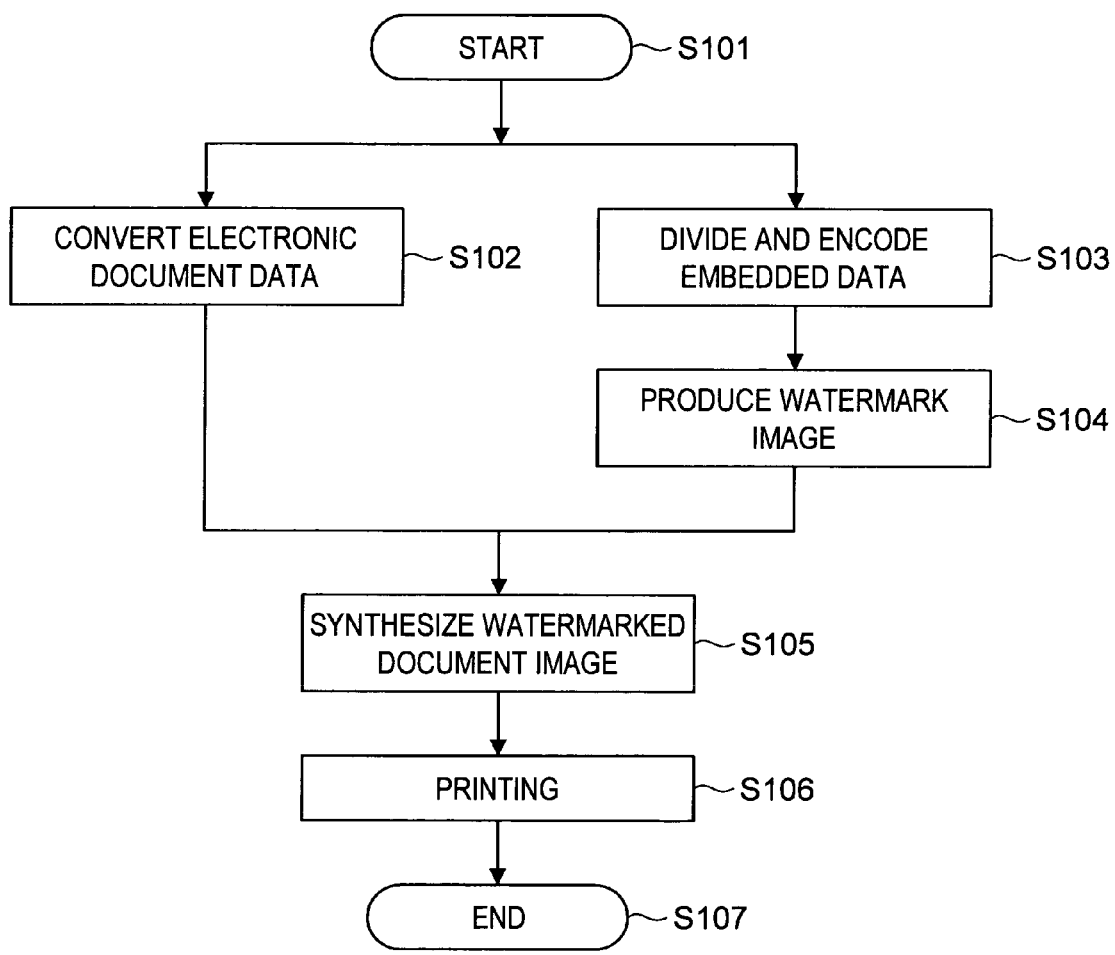
FIG. 2 is a flowchart showing an operation of a watermarked document printing apparatus 100.

FIG. 2 is a flowchart showing the operation of the watermarked document printing apparatus 100. When the process is started in Step S101, in Step S102 the document image-forming unit 101 converts the electronic document data 1 into the image having the size which can be printed on the paper.

In Step S103, the dividing and encoding unit 102 divides the embedded data 2 into arbitrary data lengths, and the error detection and correction encoding is performed to each divided block.

After the process in Step S103 is finished, the watermark image is produced in Step S104. The detailed process in Step S104 will be described later.

Figure 3:
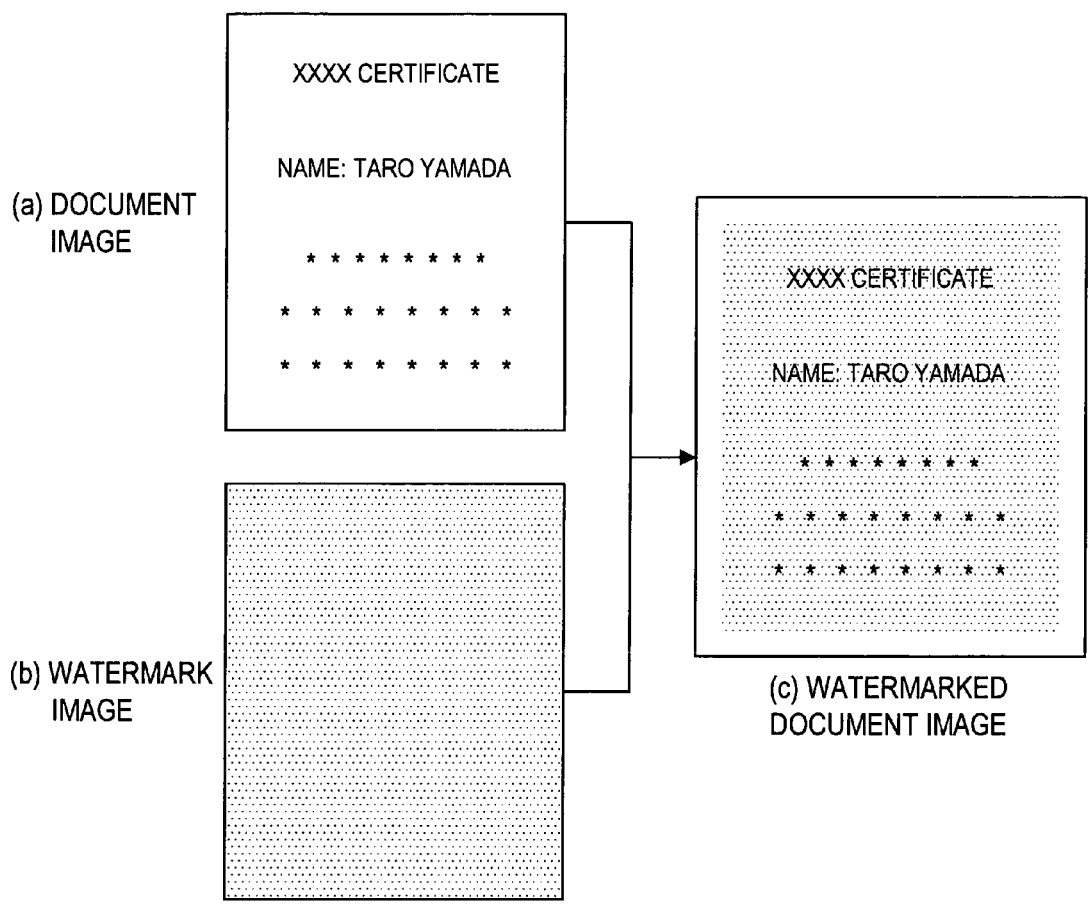
FIG. 3 is an explanatory view showing a synthesis of a document image and a watermark image.

When the processes in Steps S101 and S103 are finished, a watermarked document image is produced by synthesizing a document image and a watermark image in Step S104. FIG. 3 is an explanatory view showing (c) watermarked document image in which (a) document image and (b) watermark image are synthesized. Although the watermark image is located in the center of the paper in this case, the watermark image may be synthesized while shifted to an arbitrary position.

The overall operation of the watermarked document printing apparatus 100 is described above. Then, the watermark image producing process in Step S103 will be described.

(Explanation of Watermark Image Producing Process in Step S103)

Figure 4:
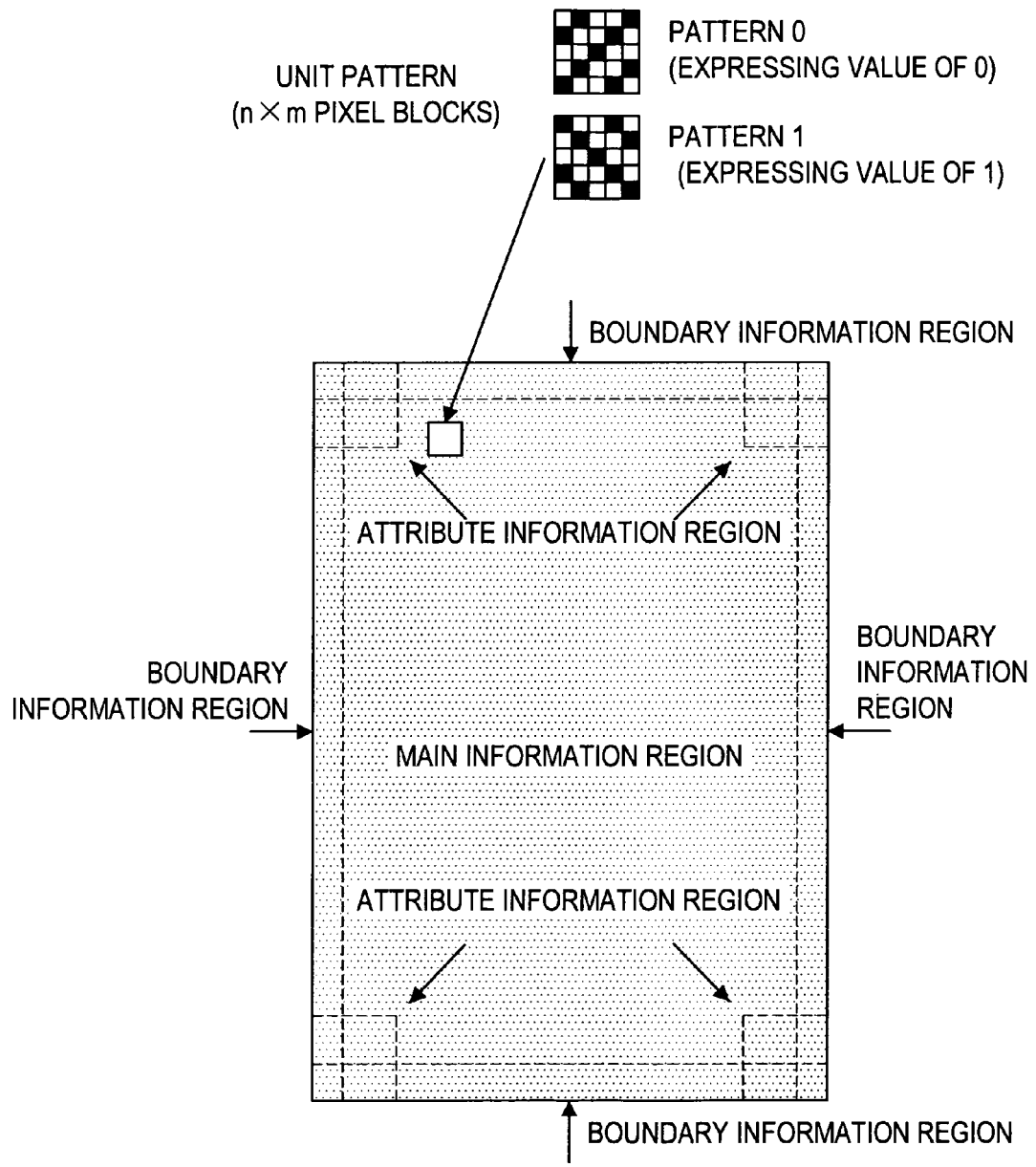
FIG. 4 shows an overall of the watermark image.
Figure 6:
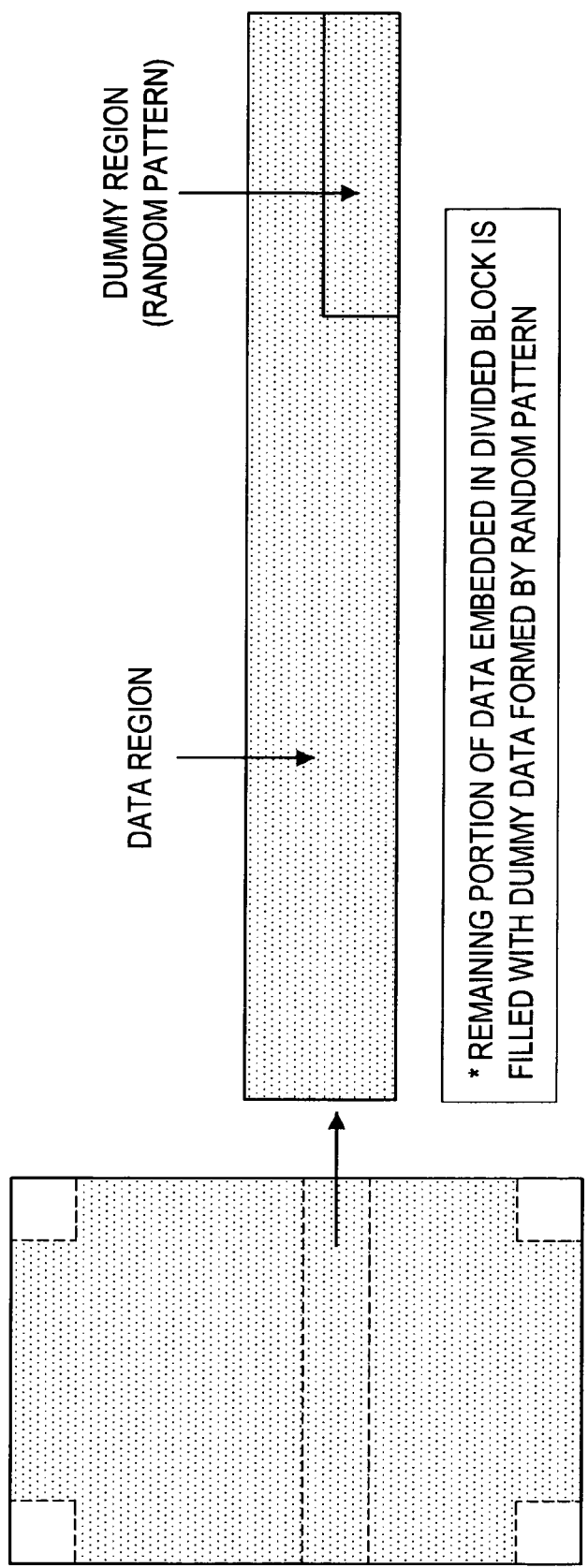
FIG. 6 is an explanatory view showing a method of adjusting an area of divided regions.

An example of the watermark image will be described with reference to FIGS. 4 to 6. FIG. 4 shows an overall of the watermark image. A minimum unit is a block having n-by-m pixels. Hereinafter the block having the n-by-m pixels is referred to as "unit pattern".

The plural unit patterns, in which a direction and/or a wavelength of a wave are changed by a dot array, are prepared in the block having the n-by-m pixels. One symbol is imparted to one unit pattern. The embedded data 2 can be expressed by combination of the unit patterns. The adoption of the unit pattern exerts an effect that a third party hardly recognizes the information embedded in the print.

When N-way unit patterns are prepared, generally each unit pattern expresses N different values. In the first embodiment, as shown in FIG. 4, there are two-way unit patterns, and each unit pattern expresses "0" and "1".

As shown in FIG. 4, the watermark image mainly includes the following three regions.

(1) Attribute Information Region

The pieces of information necessary to read the embedded data in a main information region such as the size of the embedded image and the method of dividing the main information region are stored in an attribute information region. In the case where the four attribute information regions exist as shown in FIG. 4, the same data may be stored to enhance data reading accuracy. Since the attribute information includes the data necessary to read the main information region, it is desirable that the attribute information be encoded such that the error correction ability is enhanced as much as possible.

(2) Boundary Information Region

A boundary information region indicates a boundary of the watermark image. It is necessary that the unit pattern of the boundary information region be distinguished from those of other regions by using a dedicated pattern block.

(3) Main Information Region

A main information region is a region in which the embedded data is stored. In the first embodiment, the embedded data is stored while divided.

FIG. 5 shows an example of the embedded data into a main information region. The data is embedded while horizontally divided as shown in FIG. 5A, or the data is embedded while vertically and horizontally divided as shown in FIG. 5B. In addition, the data may be embedded while obliquely divided.

Sometimes the embedded data does not coincide with the area of the divided regions of FIG. 5 when each divided embedded data is described by the unit pattern. In this case, the unit pattern is randomly inserted into the remaining portion such that the areas become equal to each other.

The same data may repeatedly be embedded in the plural regions. This enables the data to be read from another region, even if the data cannot be read at one point.

The watermark image producing process in Step S103 is performed as described above.

The operation of the watermarked document printing apparatus 100 is described above. Then, an operation of the watermarked document reading apparatus 200 will be described.

Figure 7:
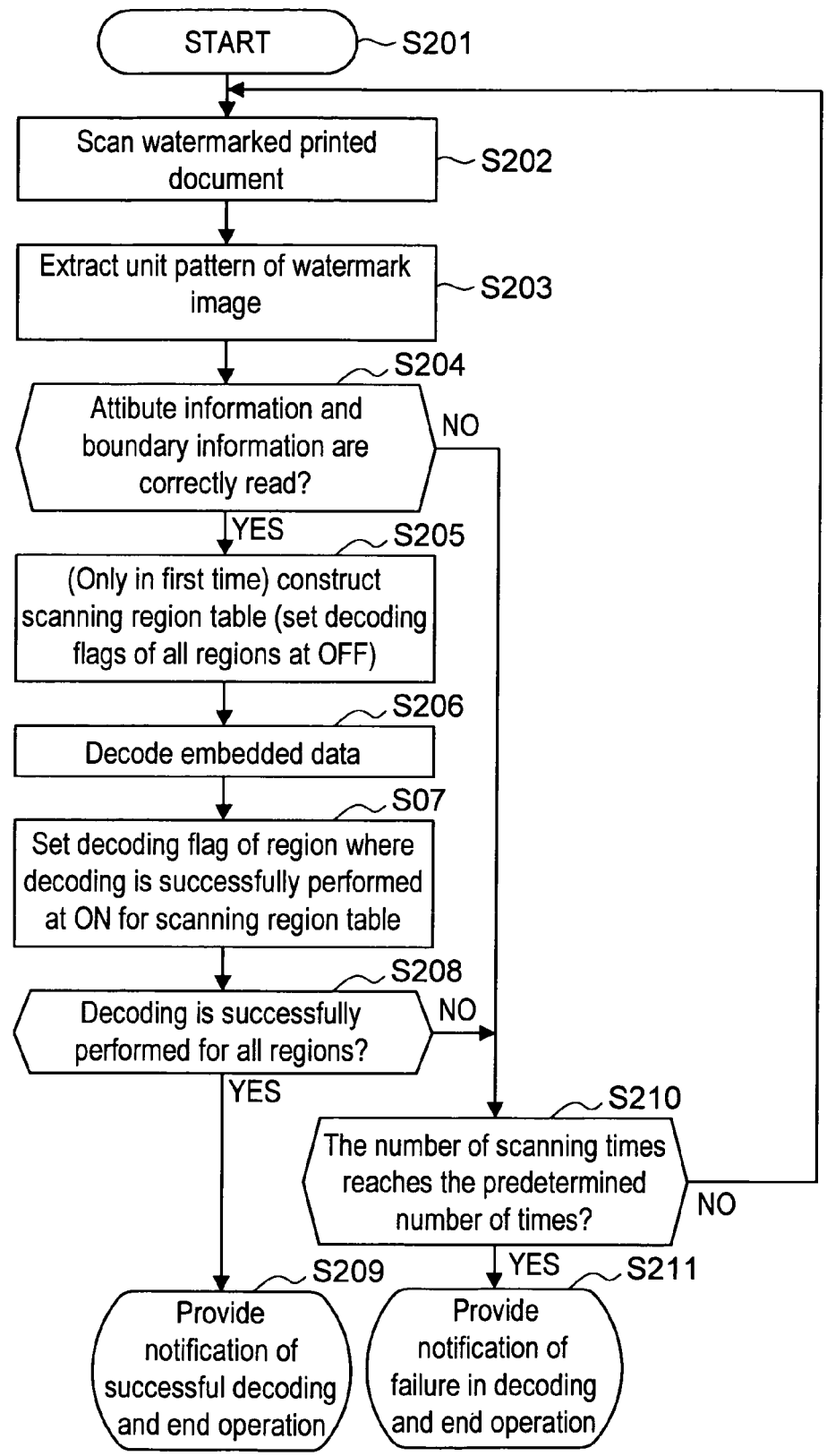
FIG. 7 is a flowchart showing an operation of a watermarked document reading apparatus 200.

FIG. 7 is a flowchart showing the operation of the watermarked document reading apparatus 200. In the watermarked document reading apparatus 200, a process of scanning the watermarked printed document is repeated until the embedded data is decoded.

When the process is started in Step S201, the watermarked printed document is read with the scanner in Step S202. A gray-scale watermarked document image is obtained from the scanner.

In Step S203, the unit pattern of the watermark image is detected from the watermarked document image. For the method of detecting the unit pattern, there is a method in which the unit pattern is identified by using a two-dimensional wavelet filter corresponding to each unit pattern.

In Step S203, first the attribute information and the boundary information are read. When the attribute information and the boundary information are correctly read in Step S204, the flow goes to Step S205. When the attribute information and the boundary information are not correctly read in Step S204, the flow goes to Step S210.

In Step S205, a scanning region table is constructed based on the attribute information. The process in Step S205 is performed only in the first-time scanning. The scanning region table constructed in Step S205 is a table in which whether the embedded data is successfully decoded in each divided region or not is recorded in the main information region of the watermark image. FIGS. 8 and 9 show specific examples. FIG. 8 shows the example of the scanning region table when each divided data is embedded in one region, and FIG. 9 shows the example of the scanning region table when the same data is embedded in the plural regions. In this case, the region where the decoding is successfully performed is expressed by a decoding flag of ON, and the other is expressed by the decoding flag of OFF. All the decoding flags are turned OFF by the process in Step S201. The number of regions and the correspondence of the region to the embedded data exist in the attribute information of the watermarked printed document.

The embedded data embedded in the main information region of the watermark image is decoded in Step S206. The process of decoding the error detection and correction code in each divided region is performed in Step S206.

In Step S207, the decoding flag of the scanning region table is set at ON for the region where the decoding is successfully performed. The decoding flag is kept OFF for the region where the decoding is not successfully performed. In the case where the same data exists in the plural regions, when one or at least the predetermined number of regions can be decoded, the decoding flag of the remaining regions in which the same data is stored may be set at ON.

In Step S208, whether the decoding in Step S207 is successfully performed for all the regions or not is confirmed from the scanning region table.

When the decoding is successfully performed for all the regions, the flow goes to Step S209. In Step S209, the decoded embedded data 2 is outputted along with a message of successful process (normal end).

On the other hand, when the flow goes to Step S210 due to the failure in decoding or the like, in Step S210, it is checked whether the number of repeated scannings reaches the predetermined number of times (for example, two times) or not. The predetermined number of times is a value arbitrarily set in consideration of use environment by a user. When the number of repeated scannings does not reach the predetermined number of times, the flow returns to Step S202 in which the watermarked printed document is scanned. When the number of repeated scannings reaches the predetermined number of times, the flow goes to Step S211. In Step S211, a message of failure in decoding is outputted, and the operation is ended. The region where the decoding is not successfully performed may be displayed along with the message of failure in decoding such that the user can make the determination of response such as replacement of the paper or stretch of the paper.

In the watermarked printed document scanning subsequent to the first time (Step S202), only the region where the decoding is not successfully performed may be scanned when the paper placed on the scanner is not moved in each scanning. This enables the process time in Step S202 to be shortened.

Sometimes it is not possible to perform scanning on only the region where the decoding is not successfully depending on the type of scanner or in the case where the paper placed on the scanner is moved in each scanning. Even in such case, only the portion in which the decoding is not performed yet may be processed in the decoding process in Step S206.

(Effect of First Embodiment)

Thus, according the first embodiment, the data embedded in the printed document is divided, the error detection and correction encoding is performed, and the divided data is embedded in the paper. Therefore, the following effects are obtained.

(1-1) The scanning process is performed again only to the portion where the decoding cannot be performed due to the temporal malfunction of the scanner or the like. Therefore, the unit pattern can efficiently be obtained.

(1-2) In the case where external environment easily has an effect on the scanner such as the stand type scanner (direct scanner), the scanning process is performed again to the portion where the decoding cannot be performed due to a shadow generated by a substance existing between the image and a light source or halation generated by outside light. Therefore, because the decoding process is performed to only the portion which cannot be obtained, the portion can efficiently be obtained.

(1-3) Even in the apparatus which can not scan only some portion of the paper in the re-scanning process, because the decoding process is performed to only the portion in which the decoding cannot be performed in the image processing, the process can efficiently be performed.

(1-4) The region where the decoding cannot finally be performed is presented to the user, so that the user can make the determination of the response from the contents.

(Second Embodiment)

In a second embodiment, on the watermark document reading apparatus side, a parameter of the scanner is changed for the region where the decoding of the embedded data is not successfully performed. Examples of the parameter include gamma correction, brightness, contrast, and resolution.

FIG. 10 is a block diagram showing a schematic configuration of a print processing system according to the second embodiment. Referring to FIG. 10, the print processing system includes the watermarked document printing apparatus 100 and a watermarked document reading apparatus 300. Because the watermarked document printing apparatus 100 of the second embodiment is substantially similar to that of the first embodiment, the repeated description will be omitted, and the watermarked document reading apparatus 300 will be described in detail.

(Watermarked Document Reading Apparatus 300)

As shown in FIG. 10, the watermarked printed document 3 is inputted to the watermarked document reading apparatus 300, and the embedded data 2 is outputted from the watermarked document reading apparatus 300. The watermarked document reading apparatus 300 includes the printed document scanning unit 201, the watermark image-extracting unit 202, the embedded data-decoding unit 203, the error detection and correction processing unit 204, and a scanning parameter-setting unit 210. The printed document scanning unit 201, watermark image extracting unit 202, embedded data decoding unit 203, and error detection and correction processing unit 204 of the second embodiment are substantially similar to those of the first embodiment, so that the repeated description will be omitted.

The scanning parameter-setting unit 210 changes the parameter of the scanner based on the image information returned from the embedded data-decoding unit 203. Examples of the image information include an average value, a variance value, and a distribution of the brightness.

The print processing system of the second embodiment is configured as described above. Then, an operation of the second embodiment will be described with a focus on the operation of the watermarked document reading apparatus 300.

Figure 11:
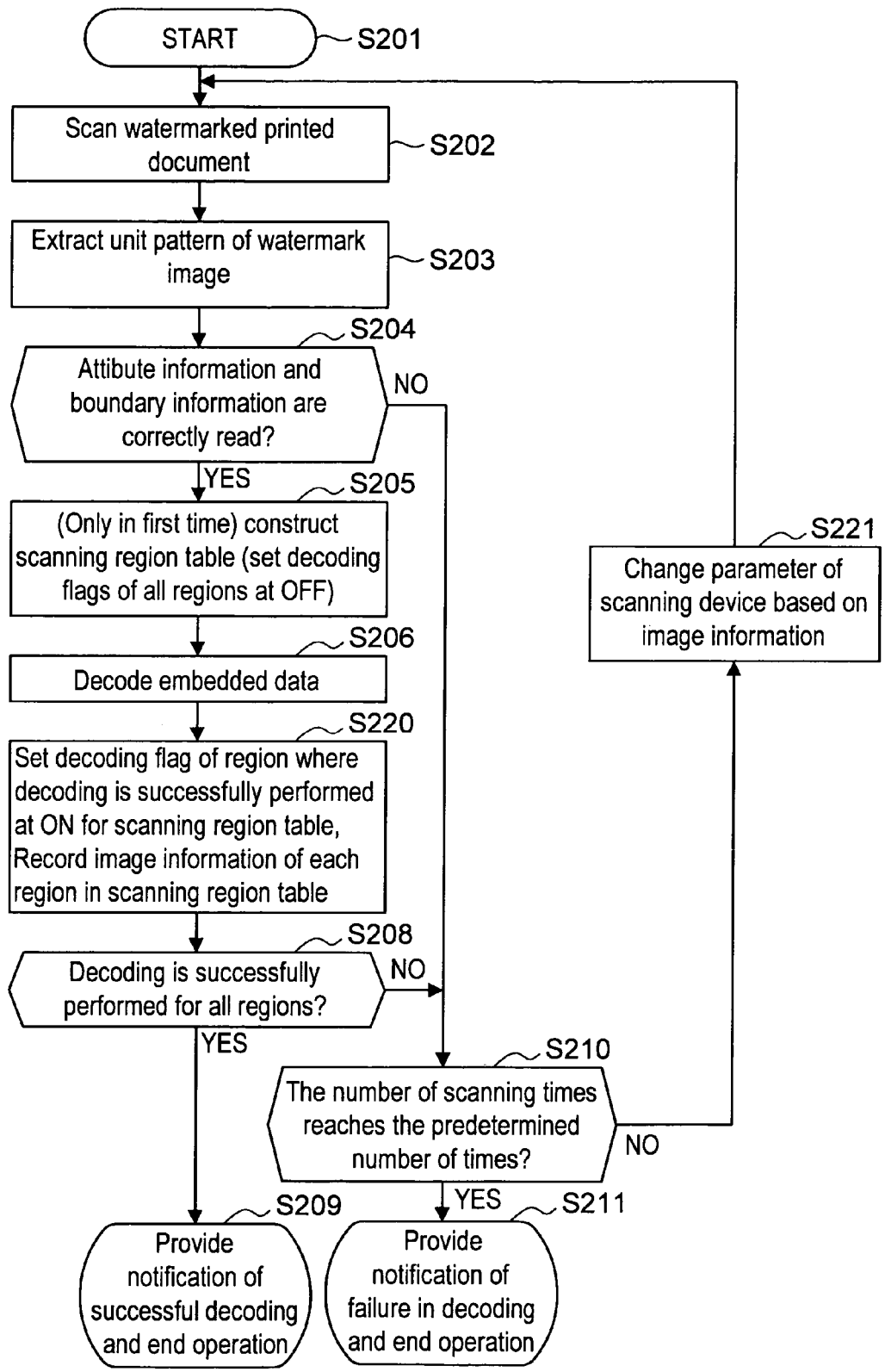
FIG. 11 is a flowchart showing an operation of a watermarked document reading apparatus 300.

FIG. 11 is a flowchart showing the operation of the watermarked document reading apparatus 300. The portions different from the first embodiment will be described below.

As shown in FIG. 12, an item in which image characteristics are recorded is newly added to the scanning region table constructed in Step S205. Examples of the image characteristics include the average value, the variance value, and the distribution of the brightness of the whole pixels of the region. For the portion overlapping a character of the document the portion may be removed from a subject of the image characteristics by making the determination from a ratio of the black pixel.

In the first embodiment, the region where the decoding can be performed is set at ON in the scanning region table (Step S207) after the process in Step S206. However, in the second embodiment, the image information of the region where the decoding cannot be performed is stored (Step S210).

In the case where the scanning is performed again to the region where the decoding is not successfully performed, in Step S221, the scanning parameter is changed based on the image information on the region where the decoding cannot be performed in the scanning region table. For example, when the brightness value is totally high (white), the brightness is lowered or the value of the gamma correction is lowered. When the brightness value is totally low (black), the brightness is changed or the value of the gamma correction is increased.

The above example is the explanation in which the scanning parameter is dynamically changed from the image information. In addition, there is a method of statically changing the scanning parameter without using the image information during the re-scanning. When the almost all of causes of failure in reading the watermark image are shortage of a toner amount on the printing side, the fixed scanning parameter corresponding to the light printing may be used in the re-scanning. The resolution may be increased in the re-scanning to perform the decoding from the finer image.

(Effect of Second Embodiment)

Thus, according to the second embodiment, the following effect is obtained in addition to the effects of the first embodiment.

(2-1) The portion where the decoding cannot be performed due to the unevenness of printing density caused by light toner on the printing side can be dealt with by dynamically or statically changing the scanning parameter according to the image information of the region.

(Third Embodiment)

A third embodiment includes a mechanism which performs the re-scanning process after a solution is instructed to the user by estimating the cause from the region where the embedded data is not successfully decoded or the image information on the watermark document reading apparatus side.

Figure 13:
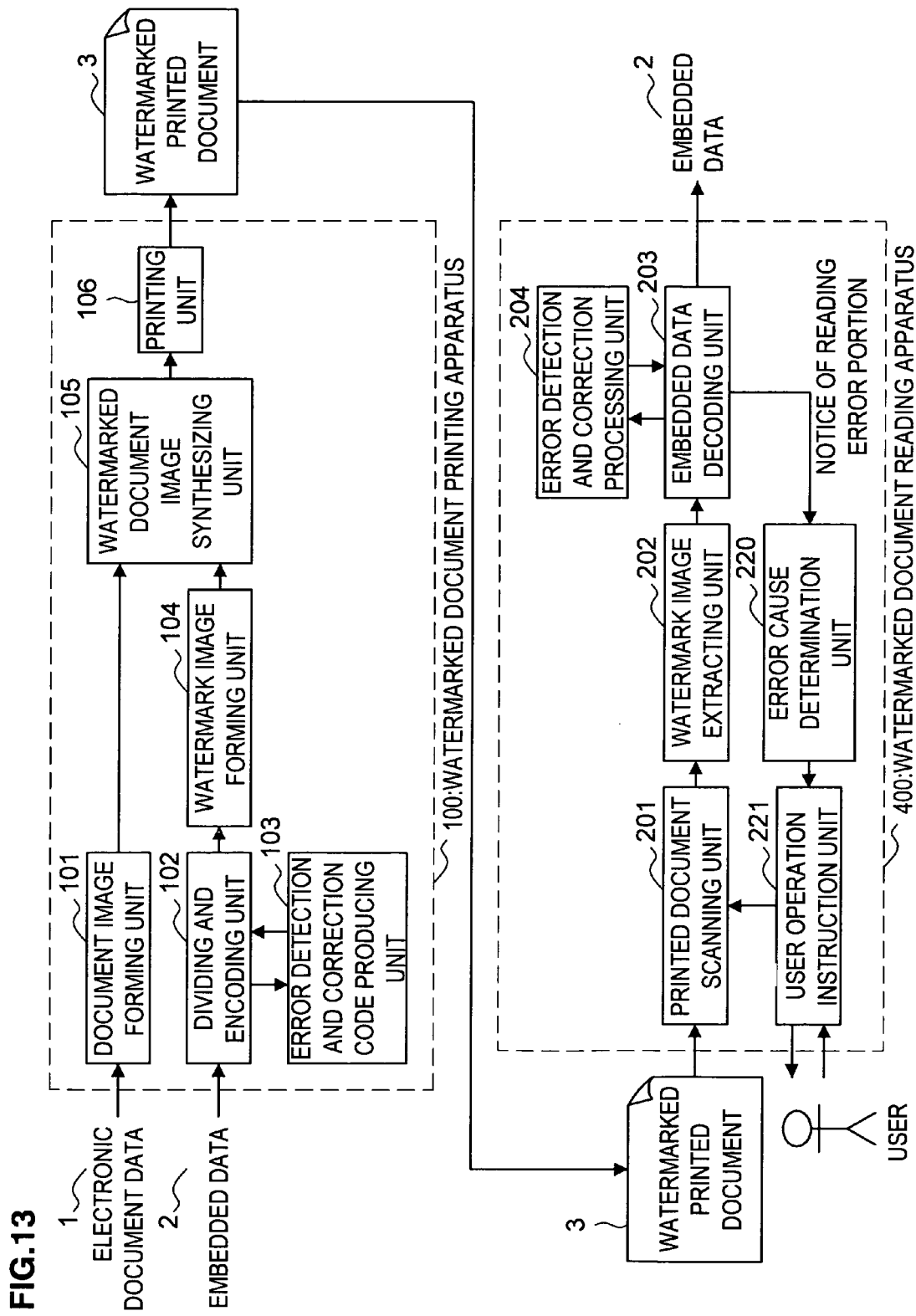
FIG. 13 is a block diagram showing a schematic configuration of a print processing system according to a third embodiment.

FIG. 13 is a block diagram showing a schematic configuration of a print processing system according to the third embodiment. Referring to FIG. 13, the print processing system includes the watermarked document printing apparatus 100 and a watermarked document reading apparatus 400. Because the watermarked document printing apparatus 100 of the third embodiment is substantially similar to that of the first embodiment, the repeated description will be omitted, and the watermarked document reading apparatus 400 will be described in detail.

(Watermarked Document Reading Apparatus 400)

As shown in FIG. 13, the watermarked printed document 3 is inputted to the watermarked document reading apparatus 400, and the embedded data 2 is outputted from the watermarked document reading apparatus 400. The watermarked document reading apparatus 400 includes the printed document scanning unit 201, the watermark image-extracting unit 202, the embedded data-decoding unit 203, the error detection and correction processing unit 204, an error cause determination unit 220, and a user operation instruction unit 221. The printed document scanning unit 201, watermark image extracting unit 202, embedded data decoding unit 203, and error detection and correction processing unit 204 of the third embodiment are substantially similar to those of the first embodiment, so that the repeated description will be omitted.

The error cause determination unit 220 performs a process of making the determination of the error cause from the region where the decoding cannot be performed.

Figure 14:
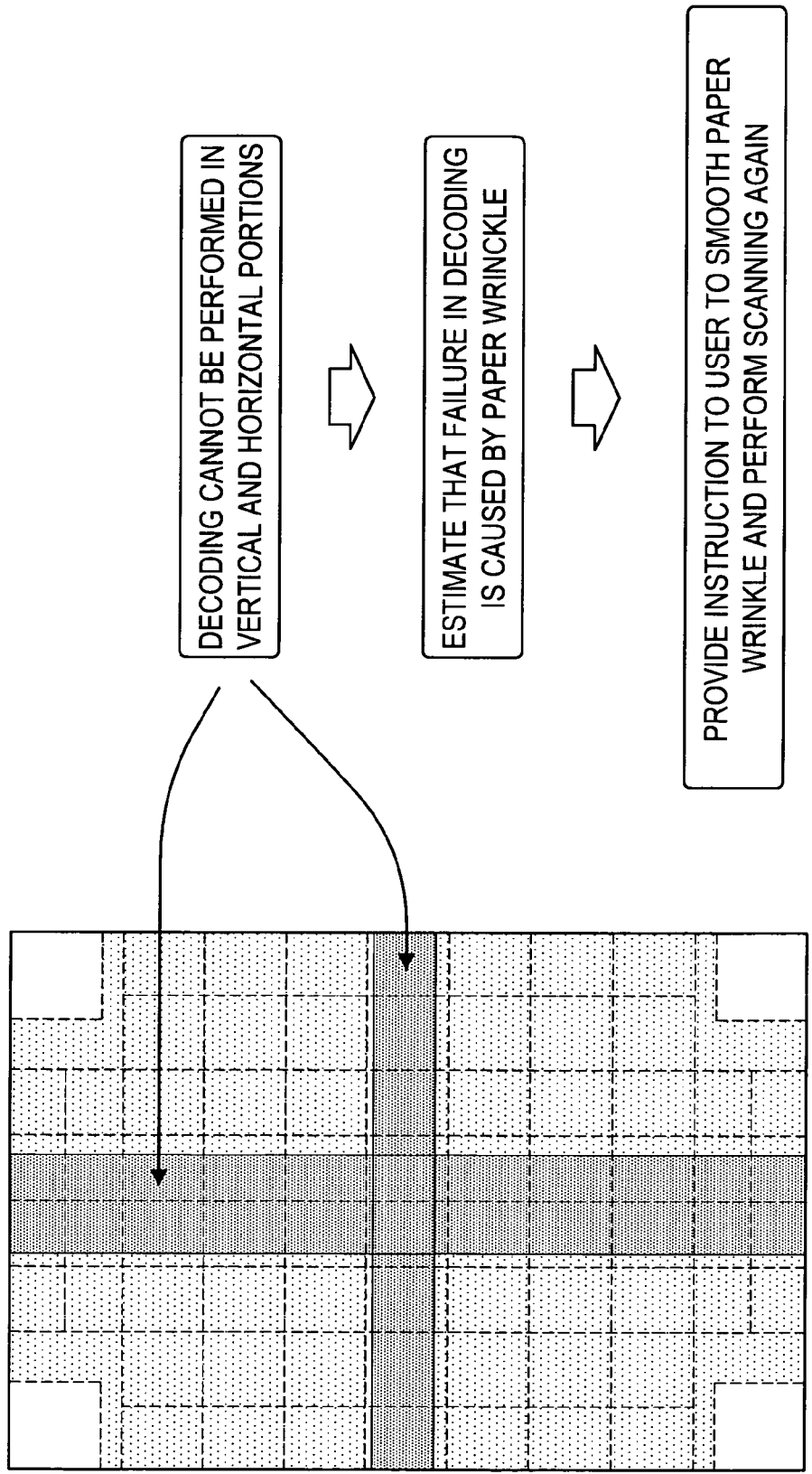
FIG. 14 shows a process of providing an instruction to a user based on a cause of error.

The user operation instruction unit 221 performs a process of providing the instruction such as "smooth a wrinkle of paper" and "remove dirt of paper" to the user based on the error cause. When the portions where the decoding cannot be performed are the vertical center portion and the horizontal center portion as shown in the specific example of FIG. 14, because it is estimated that folded wrinkles exist, the instruction that the wrinkle is sufficiently smoothed is displayed to the user, and the re-scanning process is performed.

The print processing system of the third embodiment is configured as described above. Then, an operation of the third embodiment will be described with a focus on the operation of the watermarked document reading apparatus 400.

Figure 15:
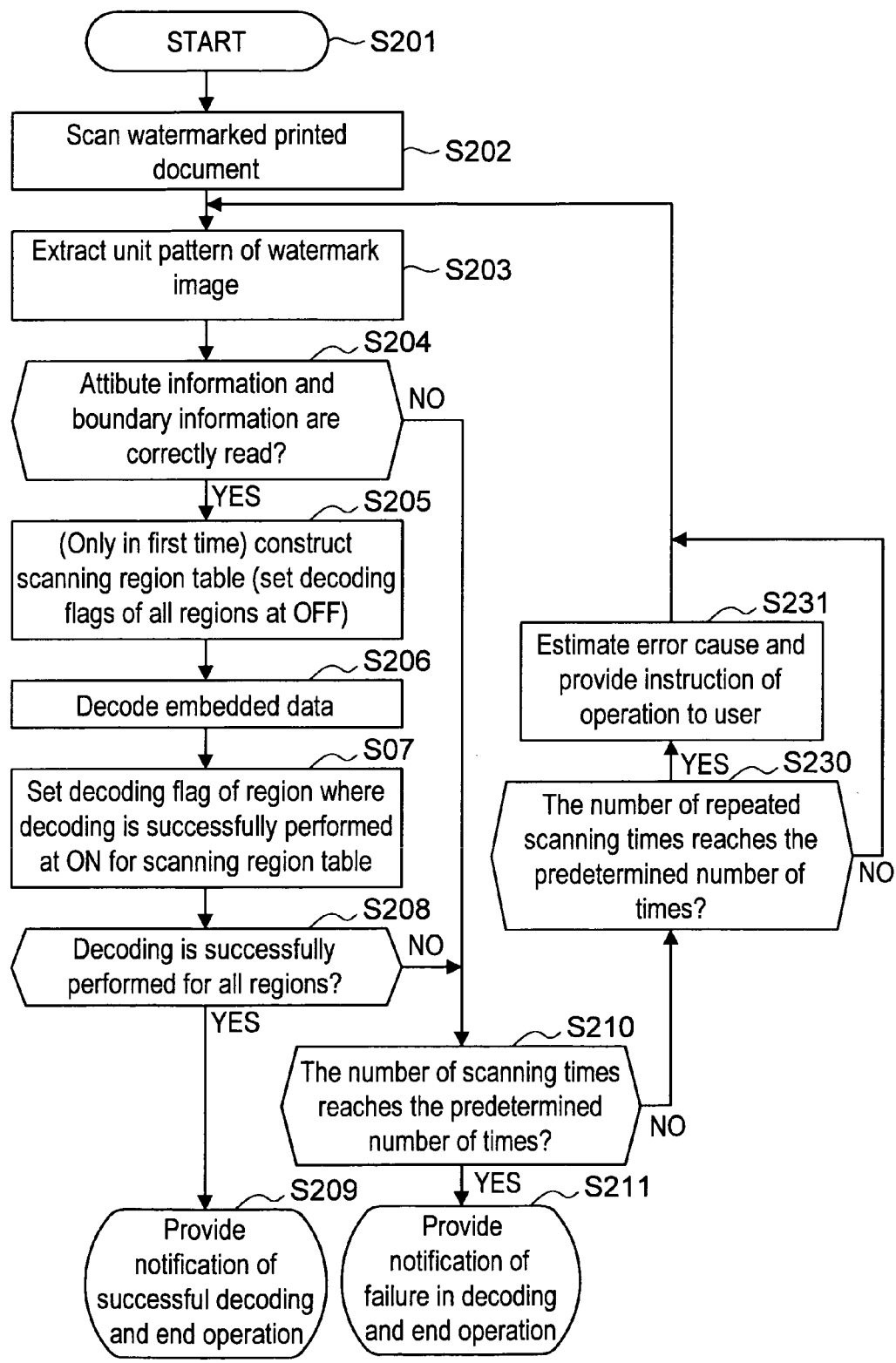
FIG. 15 is a flowchart showing an operation of a watermarked document reading apparatus 400.

FIG. 15 is a flowchart showing the operation of the watermarked document reading apparatus 400. The portions different from the first embodiment will be described below. FIG. 15 shows the case in which solution is tried by the user instruction after the decoding cannot be performed by performing the re-scanning in the first several times (for example, the first time) without providing the user instruction.

After Step S210, when the number of repeated scanning times reaches a predetermined number of times (for example, two times) in Step S230, the flow goes to Step S231. When the number of repeated scanning times does not reach the predetermined number of times, the flow goes to Step S203.

In Step S231, the instruction is provided to the user based on a decoding table or the image information. For example, it is estimated that the folded wrinkles exist vertically and horizontally in the case shown in FIG. 16A, so that the instruction that the wrinkle is smoothed is provided to the user. In the case shown in FIG. 16B, it is estimated that the dirt exists in the portion where the decoding cannot be performed, so that the instruction that the dirt is removed is provided to the user.

Alternatively, the instruction that the state of the paper is confirmed may be provided to the user without using the decoding table or the image information, when the number of repeated scanning times reaches the predetermined number of times.

There is a possibility that another sheet of paper is placed, when the user place the paper on the scanner again. Then, the paper can be identified on the apparatus side, when the information such as a document serial number which can discriminate the paper from other documents is embedded in the attribute information of the watermark image.

(Effect of Third Embodiment)

Thus, according to the third embodiment, the following effect is obtained in addition to the effects of the first embodiment.

(3-1) In the case where the decoding cannot be performed due to the paper wrinkle or dirt, it is necessary that the user smoothes the wrinkle or remove the dirt. Therefore, the third embodiment has the function of estimating the state of the paper to provide the instruction to the user. In the re-scanning after the paper is correctly placed on the scanner again, the process can efficiently be performed because only the region where the decoding cannot be performed is processed.

(Fourth Embodiment)

The scanning process is performed again to the region where the decoding cannot be performed on the watermarked image reading apparatus side in the first to third embodiments. On the contrary, in a fourth embodiment the watermark image extracting process is changed to perform the decoding process again to the region where the decoding cannot be performed. Further, in the second embodiment, the parameter of the scanner is changed based on the image information on the region where the decoding cannot be performed. On the contrary, in the fourth embodiment an extraction parameter of the watermark image is changed based on the image information on the region where the decoding cannot be performed.

Figure 17:
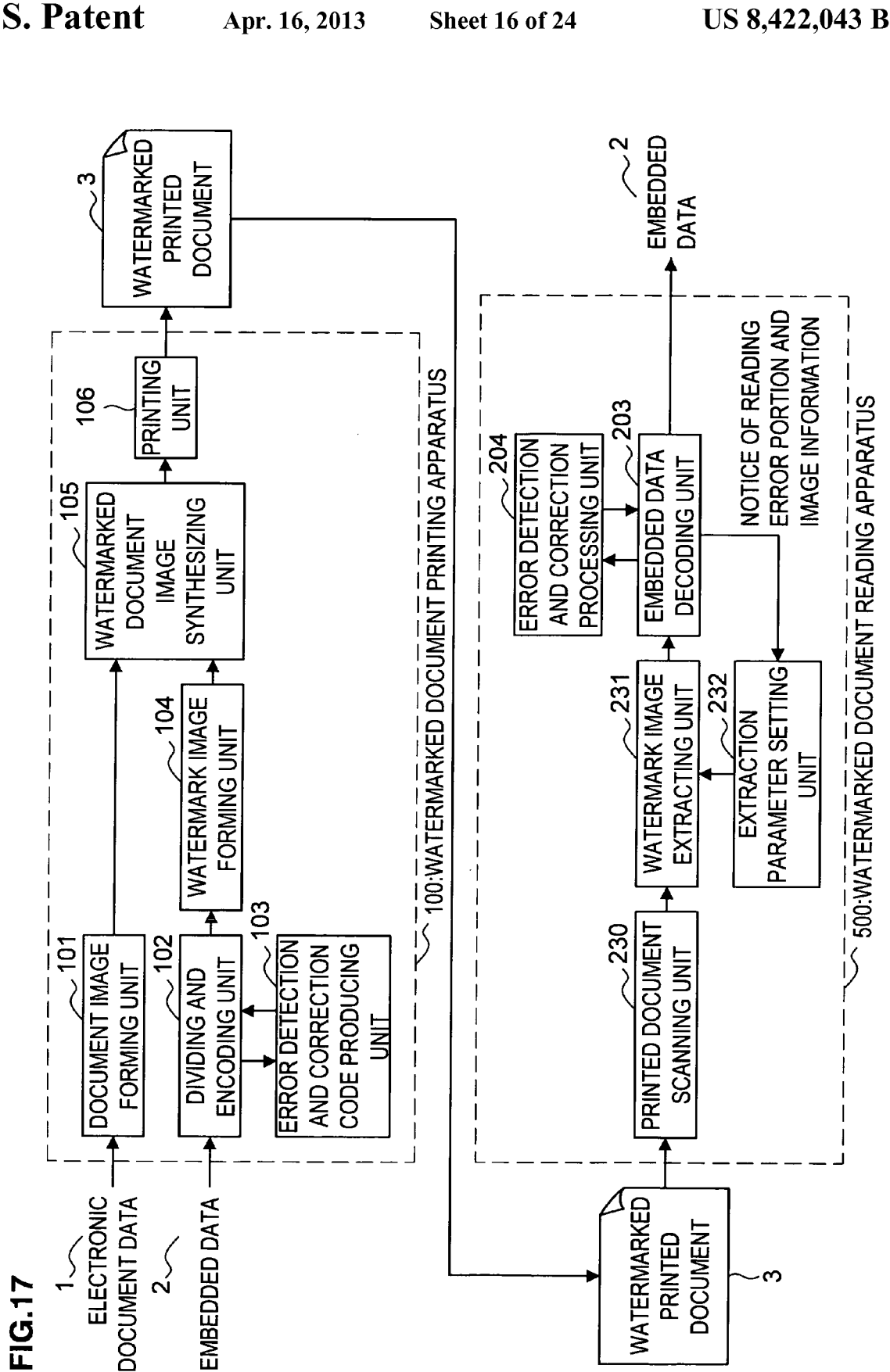
FIG. 17 is a block diagram showing a schematic configuration of a print processing system according to a fourth embodiment.

FIG. 17 is a block diagram showing a schematic configuration of a print processing system according to the fourth embodiment. Referring to FIG. 17, the print processing system includes the watermarked document printing apparatus 100 and a watermarked document reading apparatus 500. Because the watermarked document printing apparatus 100 of the fourth embodiment is substantially similar to that of the first embodiment, the repeated description will be omitted, and the watermarked document reading apparatus 500 will be described in detail.

As shown in FIG. 17, the watermarked printed document 3 is inputted to the watermarked document reading apparatus 500, and the embedded data 2 is outputted from the watermarked document reading apparatus 500. The watermarked document reading apparatus 500 includes a printed document scanning unit 230, a watermark image-extracting unit 231, the embedded data-decoding unit 203, the error detection and correction processing unit 204, and an extraction parameter-setting unit 232. Because the embedded data decoding unit 203 and error detection and correction processing unit 204 of the fourth embodiment are substantially similar to those of the first embodiment, so that the repeated description will be omitted.

The printed document-scanning unit 230 performs a process of reading the watermarked printed document in the form of the image. Specifically the printed document-scanning unit 230 is a scanner or the like. Both the flat-bed type scanner and the stand type scanner can be used as the printed document-scanning unit 230. The printed document-scanning unit 230 differs from the printed document-scanning unit 201 of the first to third embodiments in that there is no feedback input of the decoding process.

The watermark image extracting unit 231 performs a process of extracting the unit pattern embedded in the watermark image from the watermarked document image read by the printed document scanning unit 230. The signal expressed by the unit pattern is data in which the embedded data 2 is encoded by an error detection and correction code. The watermark image extracting unit 231 changes the extraction parameter of the unit pattern to perform the extracting process again to the region where the decoding cannot be performed by the feedback of the decoding process.

The extraction parameter-setting unit 232 performs a process of setting a process parameter of the watermark image-extracting unit 231 based on the image information on the region where the decoding is not successfully performed.

The print processing system of the fourth embodiment is configured as described above. Then, an operation of the fourth embodiment will be described with a focus on the operation of the watermarked document reading apparatus 500.

Figure 18:
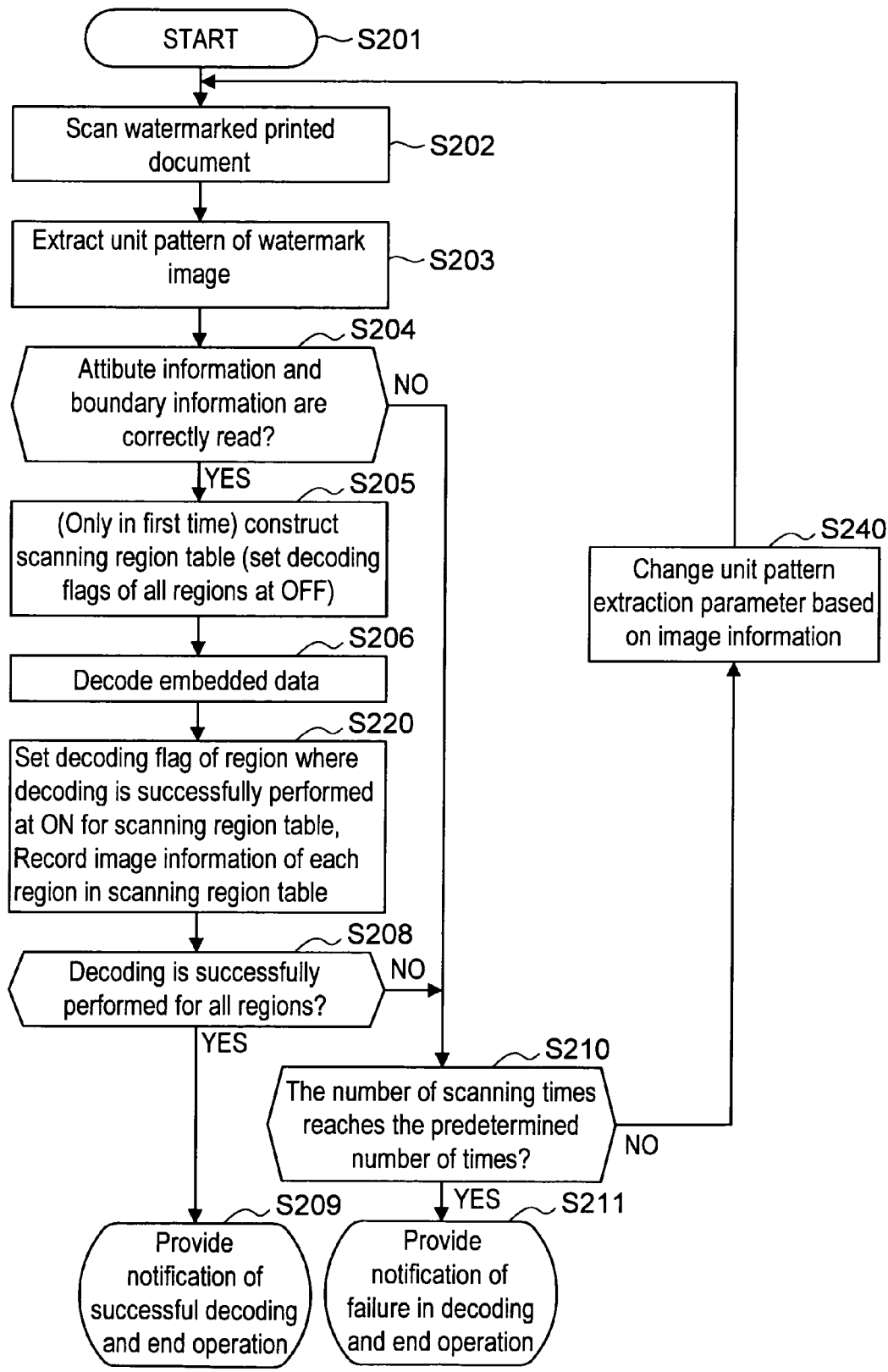
FIG. 18 is a flowchart showing an operation of a watermarked document reading apparatus 500.

FIG. 18 is a flowchart showing an operation of the watermarked document reading apparatus 500. The portions different from the first embodiment will be described below.

In Step S210, when the number of repeated scanning times reaches the predetermined number of times, the flow goes to Step S240.

In Step S240, the parameter for extracting the unit pattern of the watermark image in Step S203 is changed based on the image information on the region where the decoding cannot be performed. In this case, similarly to the second embodiment, examples of the image information include the average value, the variance value, and the distribution of the pixel brightness values.

Then, two methods will be described as an example of the parameter change of the process in Step S203.

(1) Method 1: A Pre-Process Parameter of the Input Image is changed

Before the unit pattern is extracted to the watermarked document image, the following processes are performed to the watermarked document image.

(i) Filter Process Such as Edge Enhancement and Blurring

The edge enhancement is effective process when the image is blurred or when the printing is light. The blurring is effective process against a noise (small dirt and the like).

(ii) Brightness Correction (Brightness, Contrast, Gamma Correction, and the Like)

The brightness correction is the effective process when the image is dark or bright, when the printing is light or dense.

(iii) Noise Reduction

The noise reduction is effective process against the noise (small dirt and the like).

In this case, general image processing methods can be applied.

(2) Method 2: A Pattern Model of the Unit Pattern Extraction is Changed

For example, in the case where the two-dimensional wavelet filter is used for the extraction as described above, a coefficient of the two-dimensional wavelet filter is changed. A width or the brightness of the point or the line of the image used in the pattern matching is changed when the unit pattern is extracted by pattern matching. In the case where a different method is used to extract the unit pattern, the change may be performed according to the method based on the image information.

The change in Step S203 may be performed by combining the method 1 and the method 2. In the process in Step S203, when the regions differ from one another in the image information, the parameter change may individually be performed in each region.

The above example is the explanation in which the unit pattern extraction parameter is dynamically changed from the image information. In addition, there is a method of statically changing the unit pattern extraction parameter without using the image information during the re-scanning. When the major causes of failure in reading the watermark image is the shortage of the toner amount on the printing side, the fixed scanning parameter corresponding to the light printing may be used in the re-scanning.

(Effect of Fourth Embodiment)

Thus, according to the fourth embodiment, the following effects are obtained.

(4-1) The unit pattern extraction process is performed again only to the portion where the decoding cannot be performed due to the temporal malfunction of the scanner. Therefore, the unit pattern can efficiently be obtained.

(4-2) The portion where the decoding cannot be performed due to the unevenness of printing density caused by light toner on the printing side can be dealt with by dynamically or statically changing the unit pattern extraction parameter according to the image information of the region.

(4-3) Since the proper parameter can be set according to the image characteristics of each divided region, the unit pattern can efficiently be obtained, even if the regions differ from one another in the cause of the failure in decoding.

Figure 19:
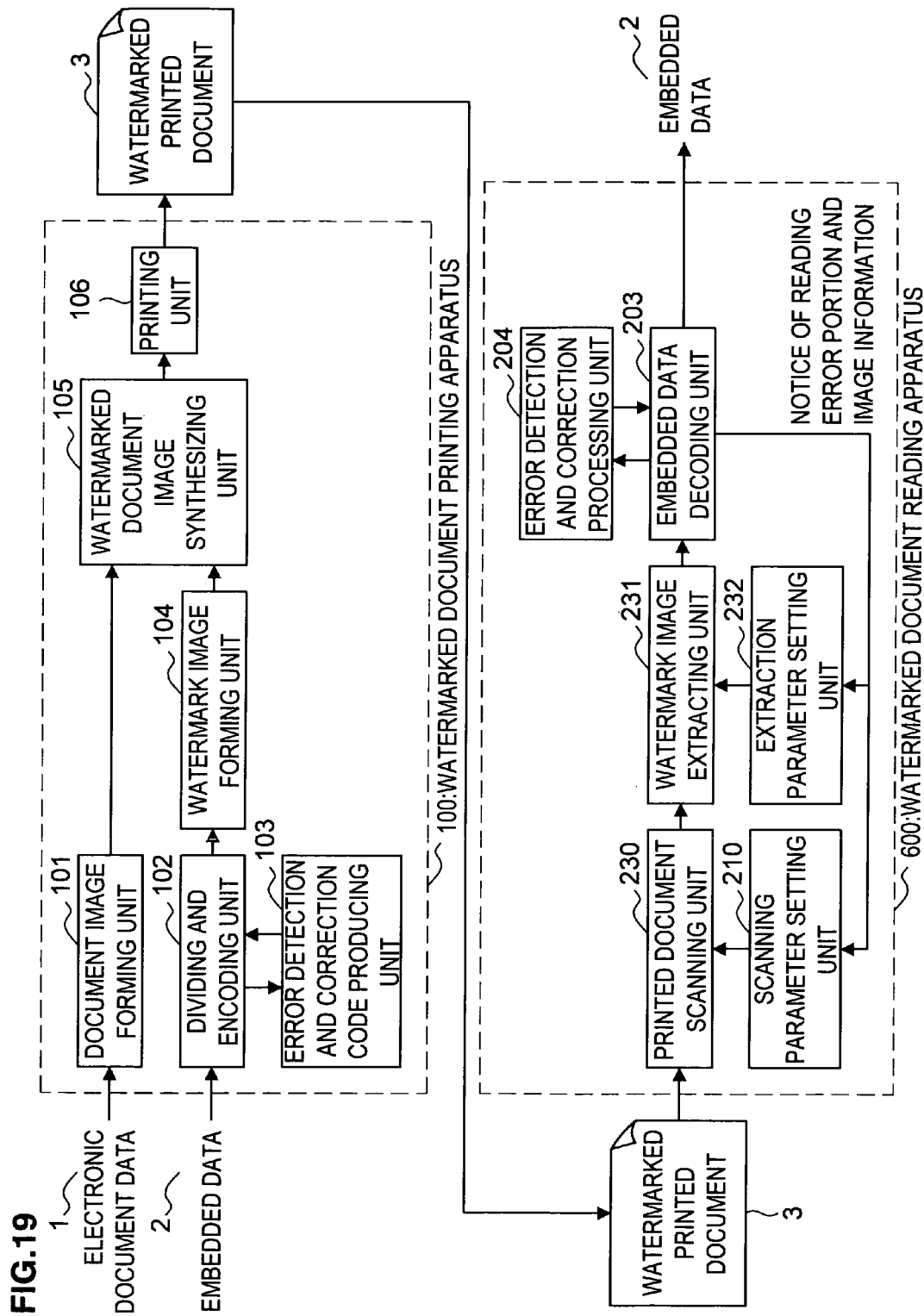
FIG. 19 is a block diagram showing a schematic configuration of a print processing system in which the second embodiment and the fourth embodiment are combined.

Further, the fourth embodiment can be combined with each of the first to third embodiments. FIG. 19 is a block diagram showing a schematic configuration of a print processing system in which the second embodiment and the fourth embodiment are combined. A watermarked document reading apparatus 600 shown in FIG. 19 includes the scanning parameter-setting unit 210 described in the second embodiment and the extraction parameter-setting unit 232 described in the fourth embodiment.

Figure 20:
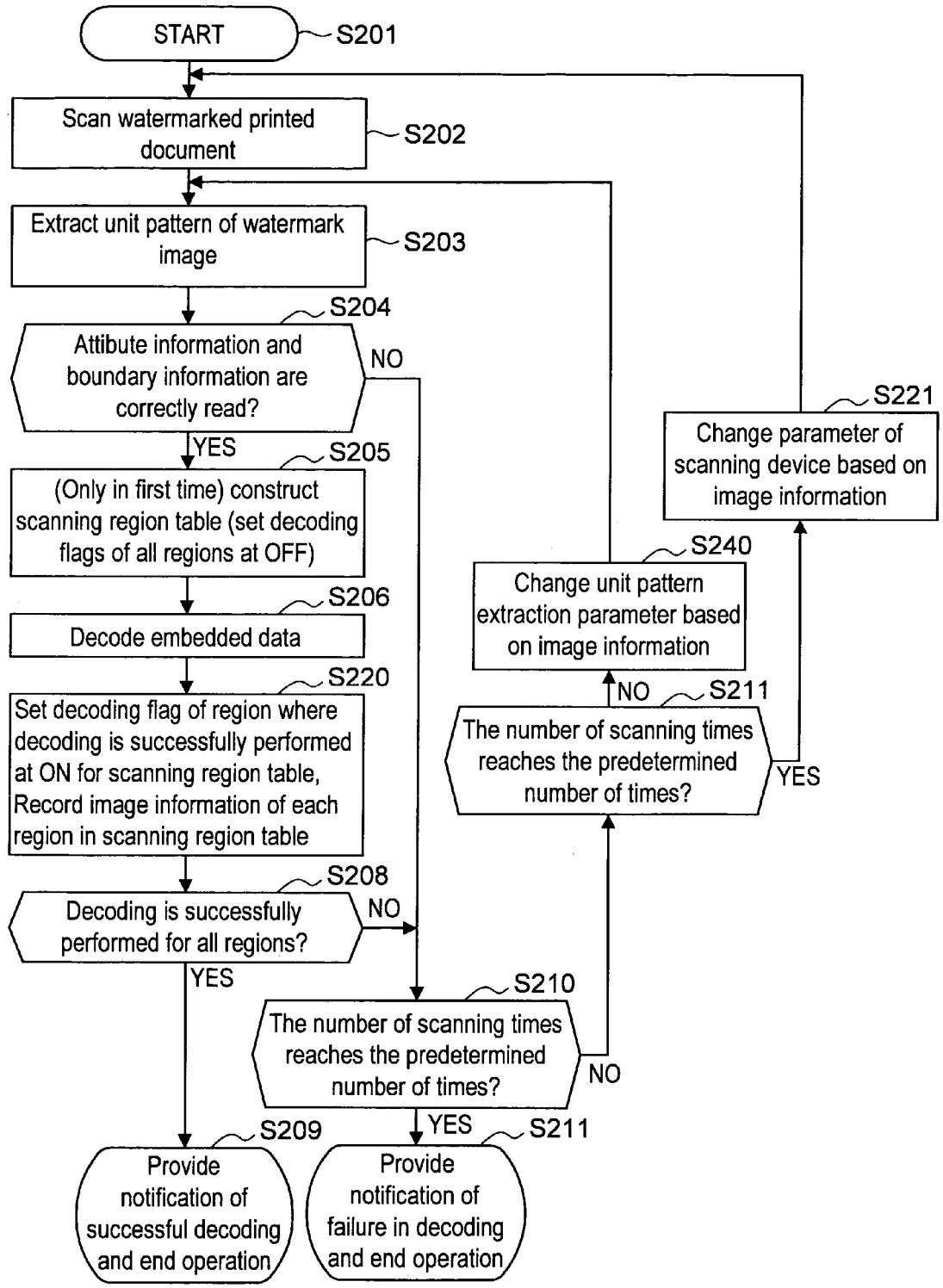
FIG. 20 is a flowchart showing an operation of a watermarked document reading apparatus 600.

FIG. 20 is a flowchart showing an operation of the watermarked document reading apparatus 600. When the number of repeated scanning times does not reach the predetermined number of times (Step S211), the unit pattern extraction parameter is changed based on the image information (Step S240), and the flow returns to the unit pattern extraction process (Step S203). When the number of repeated scanning times reaches the predetermined number of times, the unit pattern extraction parameter is changed based on the image information (Step S221), and the flow returns to the watermarked document scanning process (Step S202).

In this case, the example of the combination of modes in the second and fourth embodiments is described above with reference to FIGS. 19 and 20. The same is applied to the combinations of other embodiments.

(Fifth Embodiment)

In the first to fourth embodiments, the scanning process is performed again when the decoding cannot be performed. In a fifth embodiment the decoding is performed from the plural obtained watermarked document images in tandem with the multiple scanning processes.

Figure 21:
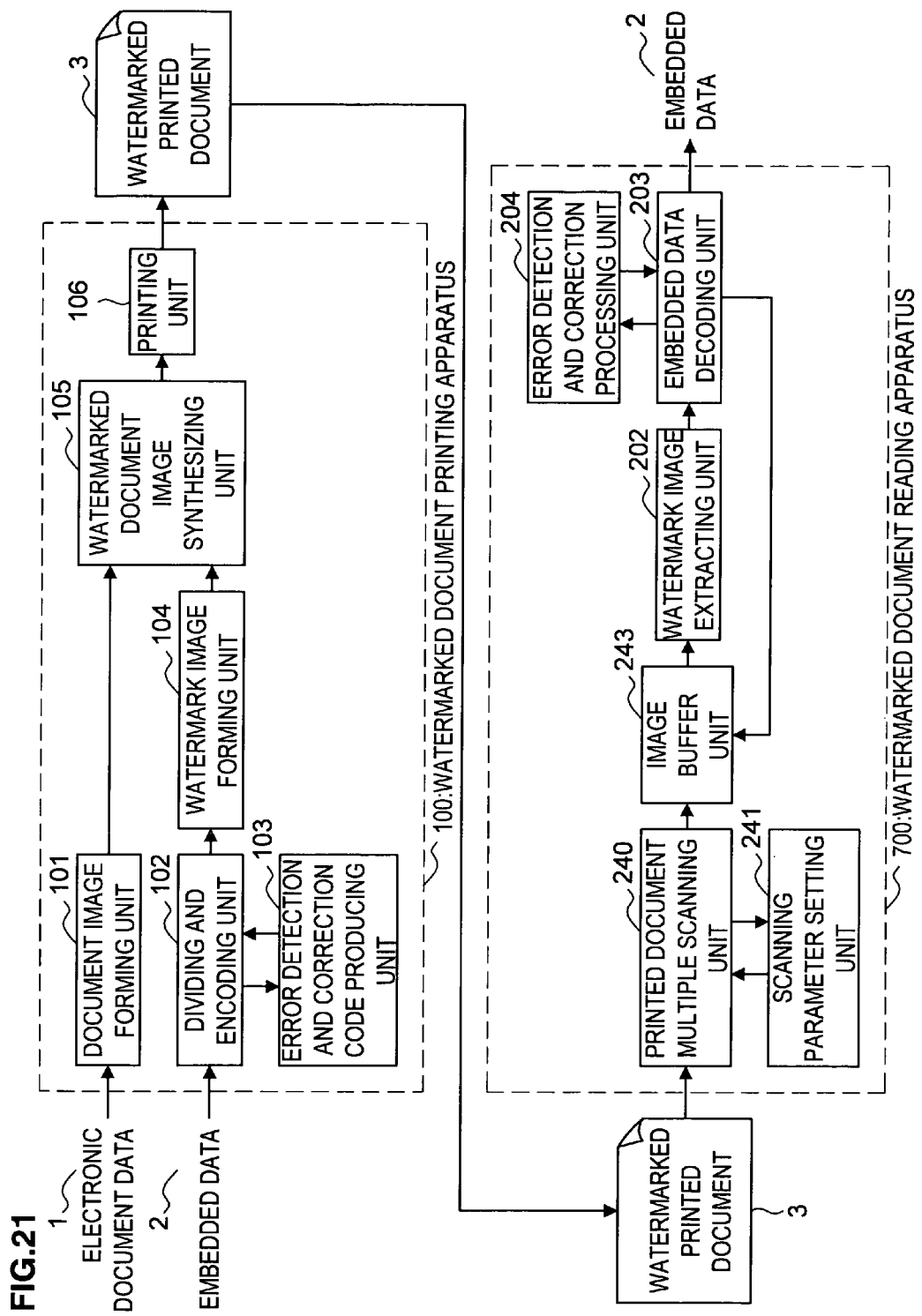
FIG. 21 is a block diagram showing a schematic configuration of a print processing system according to a fifth embodiment.

FIG. 21 is a block diagram showing a schematic configuration of a print processing system according to the fifth embodiment. Referring to FIG. 21, the print processing system includes the watermarked document printing apparatus 100 and a watermarked document reading apparatus 700. Because the watermarked document printing apparatus 100 of the fifth embodiment is substantially similar to that of the first embodiment, the repeated description will be omitted, and the watermarked document reading apparatus 700 will be described in detail.

As shown in FIG. 21, the watermarked printed document 3 is inputted to the watermarked document reading apparatus 700, and the embedded data 2 is outputted from the watermarked document reading apparatus 700. The watermarked document reading apparatus 700 includes a printed document multiple scanning unit 240, a scanning parameter setting unit 241, an image buffer unit 243, the watermark image extracting unit 202, the embedded data decoding unit 203, and the error detection and correction processing unit 204. The watermark image extracting unit 202, embedded data decoding unit 203, and error detection and correction processing unit 204 of the fifth embodiment are substantially similar to those of the first embodiment, so that the repeated description will be omitted.

The printed document multiple scanning unit 240 performs a process of multiple-scanning the watermarked printed document. The parameter of the scanner is changed in each scanning process during the multiple scanning.

The scanning parameter-setting unit 241 performs a process of providing the instruction of the parameter to the printed document multiple scanning unit 240. For example, the first scanning is performed with the normal parameter, the second-time scanning is performed while the gamma correction is increased, and the third-time scanning is performed while the gamma correction is decreased.

The image buffer unit 243 is a storage unit in which the plural watermarked document images obtained by the printed document multiple scanning unit 240 are stored.

The print processing system of the fifth embodiment is configured as described above. Then, an operation of the fifth embodiment will be described with a focus on the operation of the watermarked document reading apparatus 700.

Figure 22:
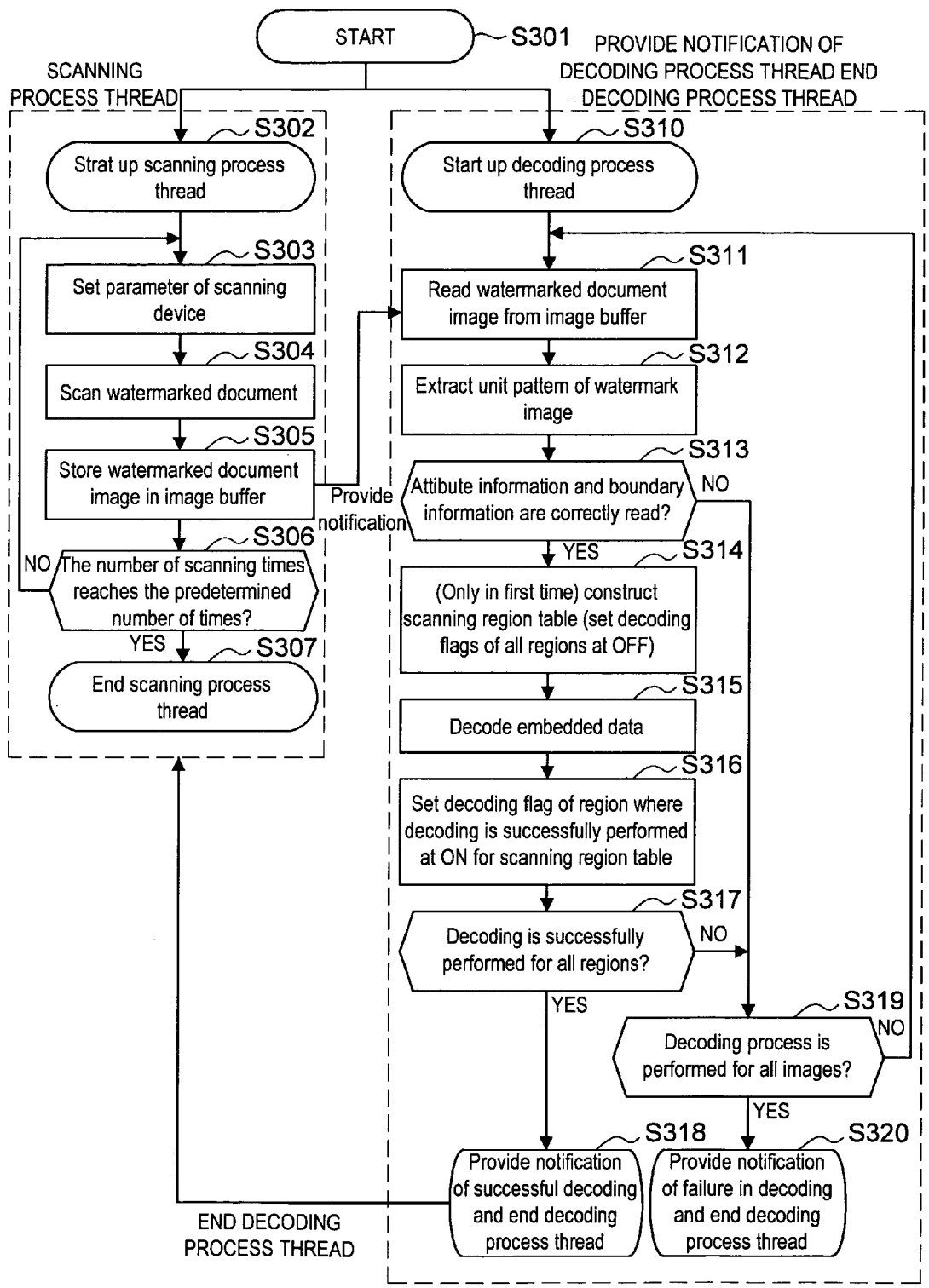
FIG. 22 is a flowchart showing an operation of a watermarked document reading apparatus 700.

FIG. 22 is a flowchart showing the operation of the watermarked document reading apparatus 700. The portions different from the first embodiment will be described below.

When the process is started in Step S301, a scanning process thread is started up (Step S302), and a decoding process thread is started up (Step S310). The scanning process thread and the decoding process thread are processes which are operated in tandem. Each role is as follows.

(i) Scanning process thread: the scanning process is performed while the parameter of the scanner is changed.

(ii) Decoding process thread: the data embedded in the watermarked document image is decoded.

The operations of the threads will be described below.

(Operation of Scanning Process Thread)

When the process is started in Step S302, the parameter of the scanning device is set according to the number of times of the scanning process in Step S303. For example, the first scanning is performed with the normal parameter, the second-time scanning is performed while the gamma correction is increased, and the third-time scanning is performed while the gamma correction is decreased. In the case where the image quality of the obtained image is varied in each case of the scanning by the external environment like the stand type scanner, the scanner may perform all the multiple scannings or a part of the multiple scannings without changing the parameter.

The watermarked printed document is scanned in Step S304.

The watermarked document images obtained in Step S305 are stored in the image buffer, and the storage of the image is transmitted to the decoding process thread.

When the number of repeated scanning times does not reach the predetermined number of times in Step S306, the flow returns to Step S303, and the scanning process is continued. When the number of repeated scanning times reaches the predetermined number of times, or when the process end is received from the decoding process thread, the operation is ended (Step S305).

The operation of the scanning process thread is described above. Then, the decoding process thread will be described.

(Operation of Decoding Process Thread)

When the operation is started in Step S310, the flow waits for the notification that the watermarked document images are stored in the image buffer from the scanning process thread in Step S311. When the watermarked document images are stored in the image buffer, the decoding is performed in Step S312 to Step S320.

The processes in Step S312 to Step S320 are substantially similar to those in Step S203 to Step S210 of the first embodiment. The decoding is sequentially performed for the region where the decoding cannot be performed yet from the watermarked document images stored in the image buffer until the decoding can be performed for all the regions.

When the decoding is successfully performed for all the divided regions, the notification of decoding process thread end is provided to the scanning process thread (Step S318).

(Effect of Fifth Embodiment)

Thus, the following effects are obtained according to the fifth embodiment.

(5-1) In the case where the scanning is repeatedly performed until the decoding can successfully be performed for all the regions, the decoding is sequentially performed in tandem with the multiple scanning, so that the process can efficiently be performed.

(5-2) The parameter is changed in each scanning, so that the fifth embodiment can widely deal with the problem such as the unevenness of the printing density caused by the light toner on the printing side.

(5-3) The process can efficiently be performed in the case where the scanning is required again because the image quality is varied in each scanning by the change in external environment like the stand type scanner.

(Sixth Embodiment)

In the fifth embodiment, the decoding is performed from the plural watermarked document images obtained in tandem with the multiple scanning processes. On the other hand, in a sixth embodiment the multiple scanning processes are performed, the image quality of each image is confirmed to sort the order of the decoding, and then the decoding is performed. The image quality shall mean the average value or the variance value of the whole of the image. A probability of fast decoding is increased by sorting the values of the image quality in the order close to a reference value.

Figure 23:
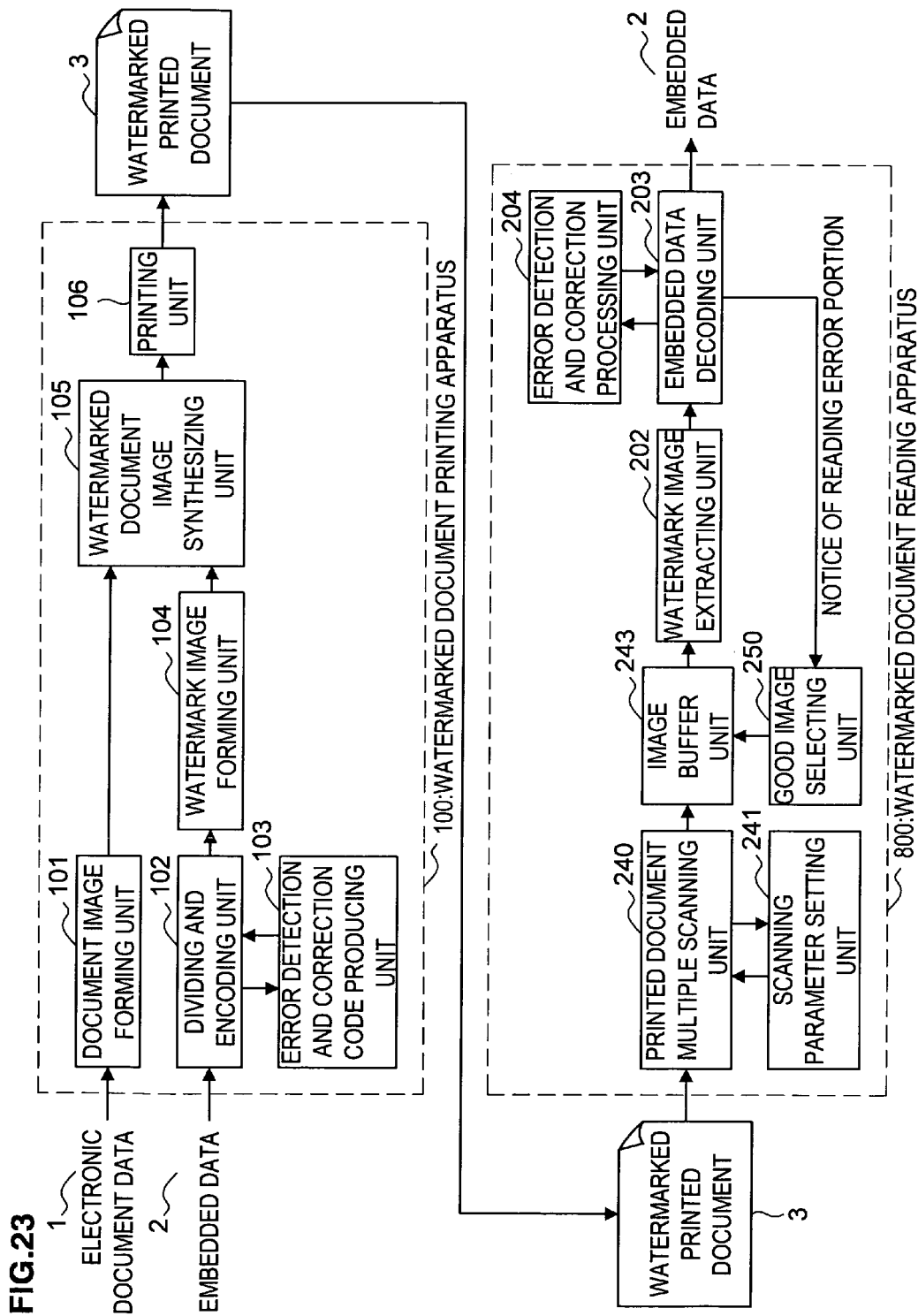
FIG. 23 is a block diagram showing a schematic configuration of a print processing system according to a sixth embodiment.

FIG. 23 is a block diagram showing a schematic configuration of a print processing system according to the sixth embodiment. Referring to FIG. 23, the print processing system includes the watermarked document printing apparatus 100 and a watermarked document reading apparatus 800. Because the watermarked document printing apparatus 100 of the sixth embodiment is substantially similar to that of the first embodiment, the repeated description will be omitted, and the watermarked document reading apparatus 800 will be described in detail.

As shown in FIG. 23, the watermarked printed document 3 is inputted to the watermarked document reading apparatus 800, and the embedded data 2 is outputted from the watermarked document reading apparatus 800. The watermarked document reading apparatus 800 includes the printed document multiple scanning unit 240, the scanning parameter setting unit 241, the image buffer unit 243, the watermark image extracting unit 202, the embedded data decoding unit 203, the error detection and correction processing unit 204, and a good image selecting unit 250. The printed document multiple scanning unit 240, scanning parameter setting unit 241, image buffer unit 243, watermark image extracting unit 202, embedded data decoding unit 203, and error detection and correction processing unit 204 of the sixth embodiment are substantially similar to those of the fifth embodiment, so that the repeated description will be omitted.

The good image-selecting unit 250 selects image quality suitable to the decoding with respect to the image stored in the image buffer unit 243. In the image setting, the good image-selecting unit 250 makes the determination from the image quality of the region where the decoding cannot be performed yet.

The print processing system of the sixth embodiment is configured as described above. Then, an operation of the sixth embodiment will be described with a focus on the operation of the watermarked document reading apparatus 800.

Figure 24:
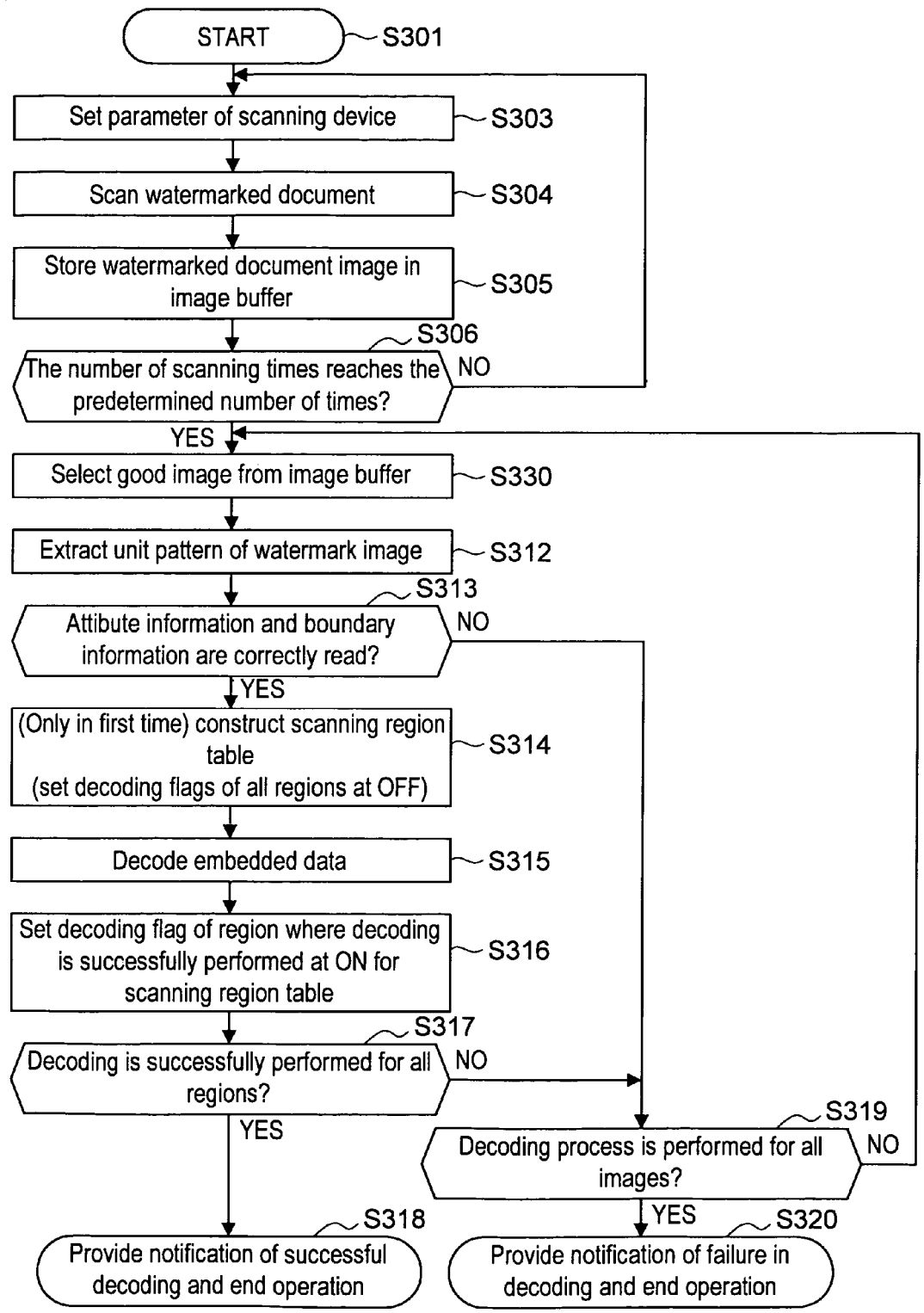
FIG. 24 is a flowchart showing an operation of a watermarked document reading apparatus 800.

FIG. 24 is a flowchart showing an operation of the watermarked document reading apparatus 800. The portions different from the fifth embodiment will be described below.

Step S303 to Step S306 in the sixth embodiment are similar to those of the fifth embodiment. In this case, the scanning process is repeated predetermined times while the parameter of the scanner is changed. In the case where the image quality of the obtained image is varied in each scanning by the external environment like the stand type scanner, the scanner may perform all the multiple scannings or a part of the multiple scannings without changing the parameter.

In Step S330, the good image for the decoding is selected from the image buffer.

For example, the selection method in Step S330 is as follows:

(i) The image in which the average value or variance value of the whole of the image is close to the reference value, and (ii) The image which has the best grade when the decoding is actually tried at a sampling point. For example, the image having a large filter output value in the case where the two-dimensional image filter is used in the decoding, or the image which is similar to a pattern model in the case where the pattern matching is used in the decoding.

First the image is selected by checking the image quality of the whole of the watermark image. Subsequently, the image is selected by checking the image quality of the region where the decoding cannot be performed.

Step S312 to Step S320 in the sixth embodiment are substantially similar to Step S203 to Step S210 in the first embodiment.

The decoding may be performed in the order obtained by the scanner without performing the process of selecting the good image in Step S330.

(Effect of Sixth Embodiment)

Thus, according to the sixth embodiment, the following effects are obtained.

(6-1) The plural document images are obtained with the scanner, and then the decoding is sequentially performed for the image having the image quality suitable for the decoding in tandem with the multiple scanning, so that the process can efficiently be performed.

(6-2) The parameter is changed in each scanning, so that the sixth embodiment can widely deal with the problem such as the unevenness of the printing density caused by the light toner on the printing side.

(6-3) The process can efficiently be performed in the case where the scanning is required again because the image quality is varied in each scanning by the change in external environment like the stand type scanner.

(Seventh Embodiment)

In the first embodiment, the image is divided into the plural regions, and the presence or absence of the error is detected in each region by marking each region with the error detection code. On the other hand, in a seventh embodiment, the region unit is not marked with the error detection code, but the error correction coding is performed to the embedded information to repeatedly embed the information in the whole of the image on the printing side. On the verification side, the number of errors of the extracted information is decreased by majority voting of the repeatedly embedded pieces of information, and the error correction code is decoded, which achieves recovery from the error. Whether the error is present or absent is determined in each unit pattern by performing the same technique (error correction code multiple repeating of information) as the embedment side to the taken-out information. At this point, it is determined that the portion where the signal patterns determined as error are densely packed is the region where the information is not successfully extracted.

Figure 25:
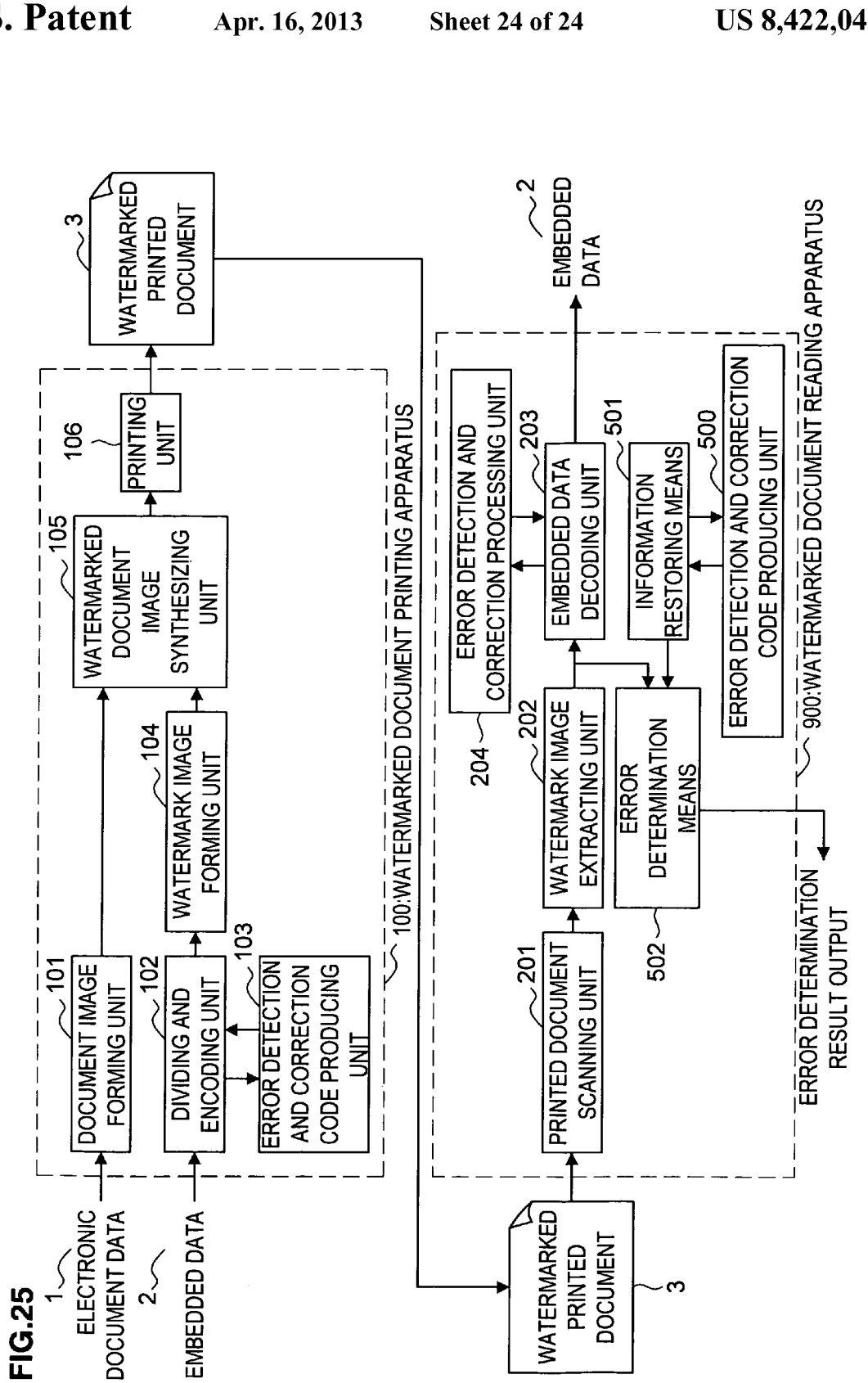
FIG. 25 is a block diagram showing a schematic configuration of a print processing system according to a seventh embodiment.

FIG. 25 is a block diagram showing a schematic configuration of a print processing system according to the seventh embodiment. Referring to FIG. 25, the print processing system includes the watermarked document printing apparatus 100 and a watermarked document reading apparatus 900. Because the watermarked document printing apparatus 100 of the seventh embodiment is substantially similar to that of the first embodiment, the repeated description will be omitted, and the watermarked document reading apparatus 900 will be described in detail.

As shown in FIG. 25, the watermarked printed document 3 is inputted to the watermarked document reading apparatus 900, and the embedded data 2 is outputted from the watermarked document reading apparatus 900. The watermarked document reading apparatus 900 includes the printed document scanning unit 201, the watermark image-extracting unit 202, the embedded data-decoding unit 203, the error detection and correction processing unit 204, an error detection and correction code producing unit 500, an information restoring means 501, and an error determination means 502. The printed document scanning unit 201, watermark image extracting unit 202, embedded data decoding unit 203, and error detection and correction processing unit 204 of the seventh embodiment are substantially similar to those of the first embodiment, so that the repeated description will be omitted.

The error detection and correction code-producing unit 500 performs the process in the same manner as the error detection and correction code producing unit 103 on the embedment side.

The information restoring means 501 determines the information embedded in the whole of the image from the embedded data outputted from embedded data decoding unit 203 in the same manner as the dividing and encoding unit 102 on the printing side.

The embedded data 2 inputted to the watermarked document printing apparatus becomes identical to the embedded data 2 which is of the output of the watermarked document reading apparatus, so that the outputs of the information restoring means 501 and dividing and encoding unit 102 become the identical information. Therefore, the reading apparatus side can learn which pattern is arranged at a position on the image.

The error determination means 502 can make determination of the error in each unit pattern by comparing the information obtained from the information restoring means 501 and the information obtained from the watermark image-extracting unit 202.

After the error determination, similarly to the first embodiment, the printed document-scanning unit may scan the range where the error rate is high again depending on a distribution pattern of density of the error signal. Similarly to the second embodiment, the scanning may be performed again to the range where the error rate is high by changing the parameter of the scanner. Similarly to the third embodiment, the instruction that the paper is placed again may be provided to the user. Similarly to the fourth embodiment, the reading process may be performed to the range where the error rate is high by changing the extraction process.

Similarly to the fifth embodiment, the process performed with the scanner may be performed in tandem with the decoding process. Similarly to the sixth embodiment, the plural images may be scanned to perform the reading process in the order of good image quality.

For the error detection and correction code, the coding may be performed to the whole pieces of data, or the coding may be performed to each divided piece of data.

(Effect of Seventh Embodiment)

Thus, according to the seventh embodiment, the following effect is obtained.

(7-1) The presence or absence of the error is determined in each unit pattern, so that the error point can be specified in detail.

Thus, the print processing system, watermarked document printing apparatus, watermarked document reading apparatus, print processing method, information reading apparatus, and information reading method according to the preferred embodiments of the invention are described with reference to the accompanying drawings. However, the invention is not limited to the above embodiments. It is obvious for those skilled in the art that various changes and modifications could be made without departing from the technical thought described in claims of the invention, and it is understood that the changes and modifications shall be included in the technical range of the invention.

For example, the following applications can be made.

(1) For the data length in dividing the embedded data, in addition to the fixed length, the data length may be changed according to contents of the data. For example, when the embedded data is a character string, the data length may be divided into each sentence unit.

(2) The watermark image formed by the points of the binary image is described by way of example. The invention is not limited to the watermark image formed by the points of the binary image. For example, a gray-scale color pixel may be used as the pixel, and the inside of the unit pattern may be formed not by the points but by the lines. The barcode and two-dimensional barcode which are of the well-known art can be applied to the embedment of the information in the document. The invention can be applied to the electronic watermarking technology for general images.

(3) The above embodiments may be combined.

(4) Although the embodiments are described based on the assumption of the printed document to the paper in the above embodiments, the invention can be applied to the printed documents made of organic compounds such as plastic, metal, and fiber.

(5) Although the watermark image and the document image are superposed on each other in the above embodiments, the invention can be applied to the case where only the watermark image is printed.

(6) In addition to the printed document, the invention can be applied to the electronic watermark for photograph and the like.

The invention can be utilized in the printing apparatus and reading apparatus of the watermarked document in which the secret information is embedded by the electronic watermarking technology, the print processing system including the pieces of apparatus as the system component, and the print processing method.

What is claimed is:

1. A watermarked document reading apparatus which reads a watermarked document image from a sheet of paper and takes out secret information, the watermarked document reading apparatus comprising:
a printed document scanning unit which reads the watermarked document image from the sheet of paper;
a watermark image extracting unit which extracts pattern images forming a watermark image from the watermarked document image read by the printed document scanning unit, the extracted pattern images being converted into encoded data;
an embed data decoding unit which runs decoding of the encoded data with respect to each of a plurality of divided regions for error detection and correction, and generates position information and pixel brightness information about any divided regions where decoding of the embedded data has not been successfully performed;
a scanning parameter setting unit which changes a scanning parameter based on the pixel brightness information, the scanning parameter that is changed being at least one of a scanned image brightness value and a gamma correction value; and
an error detection and correction processing unit which executes decoding of the encoded data,
wherein the printed document scanning unit re-reads any divided regions where decoding has not been successfully performed using the changed scanning parameter, without re-reading all of the divided regions.

2. The watermarked document reading apparatus according to claim 1, further comprising:
an image buffer unit in which a plurality of watermarked document images obtained by the printed document scanning unit are stored,
wherein the printed document scanning unit performs multiple scanning of the watermarked document image.

3. The watermarked document reading apparatus according to claim 2, further comprising a image quality determination unit which selects an image quality suitable for the decoding from the images stored in the image buffer unit.

4. The watermarked document reading apparatus according to claim 1, further comprising a display unit which displays any divided region where the decoding has not been eventually executed.

5. A watermarked document reading apparatus which reads a watermarked document image from a sheet of paper and takes out secret information, the watermarked document reading apparatus comprising:
a printed document scanning unit which reads the watermarked document image from the sheet of paper;
a watermark image extracting unit which extracts pattern images forming a watermark image from the watermarked document image read by the printed document scanning unit, the extracted pattern images being converted into encoded data;
an embed data decoding unit which runs decoding of the encoded data with respect to each of a plurality of divided regions for error detection and correction, and generates position information identifying any divided region where decoding of the embedded data has not been successfully performed;
an error detection and correction processing unit which executes the decoding of the encoded data;
an error cause determination unit which determines whether an error has been caused because the sheet of papers is wrinkled or dirty based on the position information; and
a user operation instruction unit which provides information to a user based on the error cause,
wherein the printed document scanning unit re-reads any divided regions where decoding has not been successfully performed using the changed scanning parameter, without re-reading all of the divided regions.

6. The watermarked document reading apparatus of claim 5, wherein the printed document scanning apparatus re-reads at least a portion of the watermarked document image on the sheet of paper if the information generated by the embed data decoding unit indicates at least one divided region exists where the error correction has not been successfully performed.

7. A watermarked document reading apparatus which reads a watermarked document image from a sheet of paper and takes out secret information, the watermarked document reading apparatus comprising:
a printed document scanning unit which reads the watermarked document image from the sheet of paper;
a watermark image extracting unit which extracts pattern images forming a watermark image from the watermarked document image read by the printed document scanning unit, the extracted pattern images being converted into encoded data;

an embed data decoding unit which runs decoding of the encoded data with respect to each of a plurality of divided regions for error detection and correction, and generates image characteristic information about any one or more of the divided regions where decoding of the embedded data has not been successfully performed;

an error detection and correction processing unit which executes the decoding of the encoded data; and an extraction parameter setting unit which sets a process parameter of the watermark image extracting unit based on the image characteristic information, wherein the watermark image extracting unit re-extracts the pattern images from any one or more of the divided regions where decoding of the embedded data has not been successfully performed, without re-extracting the pattern images from all of the divided regions, using the process parameter set by the extraction parameter setting unit.

8. The watermarked document reading apparatus of claim 7, wherein the printed document scanning apparatus re-reads at least a portion of the watermarked document image on the sheet of paper if the information generated by the embed data decoding unit indicates at least one divided region exists where the error correction has not been successfully performed.

* * * * *